United States Patent [19]
Saitou

[11] Patent Number: 5,424,180
[45] Date of Patent: * Jun. 13, 1995

[54] APPARATUS FOR UNIFORM MIXING OF SOLUTIONS

[75] Inventor: Mitsuo Saitou, Kanagawa, Japan

[73] Assignee: Fuji Photo Film Co., Ltd., Kanagawa, Japan

[ * ] Notice: The portion of the term of this patent subsequent to Apr. 13, 2010 has been disclaimed.

[21] Appl. No.: 996,866

[22] Filed: Dec. 15, 1992

Related U.S. Application Data

[63] Continuation of Ser. No. 628,127, Dec. 17, 1990, abandoned.

[30] Foreign Application Priority Data

Mar. 27, 1990 [JP] Japan .................................. 2-78534

[51] Int. Cl.⁶ ............................................. G03C 1/015
[52] U.S. Cl. .................................. 430/569; 423/491
[58] Field of Search ............................ 430/569; 423/491

[56] References Cited

U.S. PATENT DOCUMENTS

| | | |
|---|---|---|
| 2,383,946 | 9/1945 | Tietig . |
| 3,782,954 | 7/1974 | Porter et al. .................. 430/569 |
| 4,879,208 | 11/1989 | Urabe ............................ 430/569 |
| 5,035,991 | 7/1991 | Ichikawa et al. ............... 430/569 |
| 5,202,226 | 4/1993 | Saitou ............................ 430/569 |

FOREIGN PATENT DOCUMENTS

| | | |
|---|---|---|
| 0326852 | 1/1989 | European Pat. Off. . |
| 1079452 | 4/1960 | Germany . |
| 59-67532 | 4/1984 | Japan ............................ 430/569 |

*Primary Examiner*—Janet C. Baxter
*Attorney, Agent, or Firm*—Sughrue, Mion, Zinn, Macpeak & Seas

[57] ABSTRACT

An apparatus for producing a highly uniform mixture of a first solution with two or more solute-containing solutions comprises a reaction vessel with a porous member located therein. The porous member, whic may be a membrane or a plurality of fine tubes, is located within the vessel below the surface of the first solution. One or more solute-containing solutions are rapidly and uniformly introduced into the first solution through the porous member. The solute containing solutions diffuse rapidly into the first solution through the openings in the porous member, mixing evenly to produce a uniform composition.

22 Claims, 6 Drawing Sheets

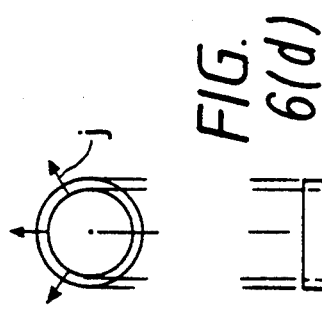
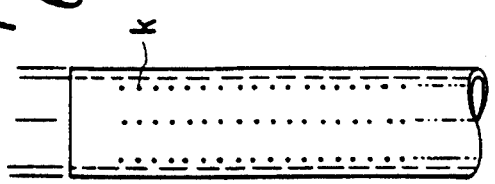
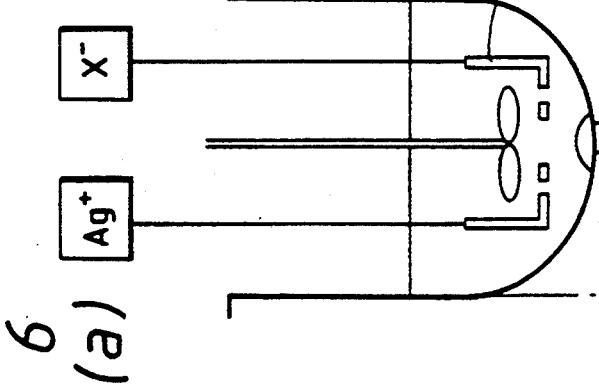
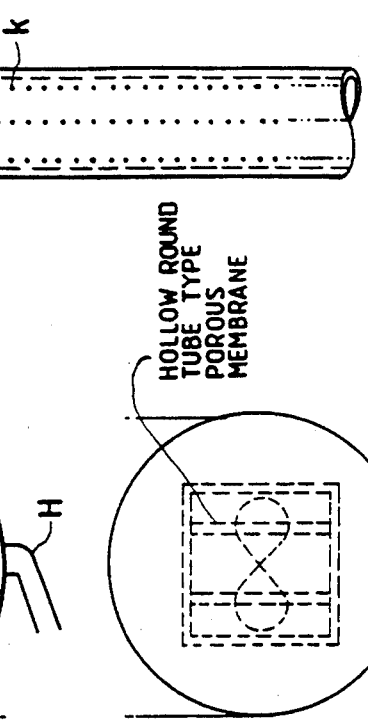
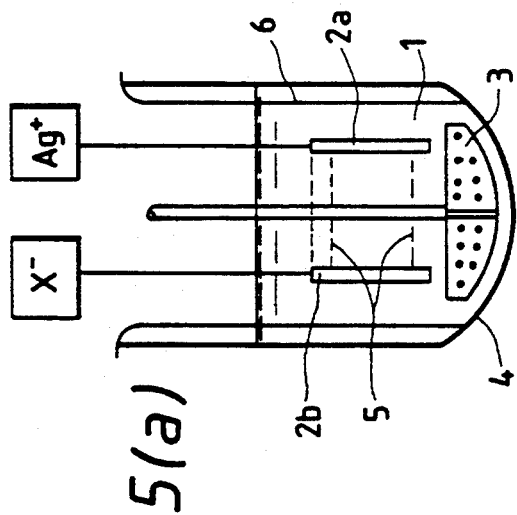
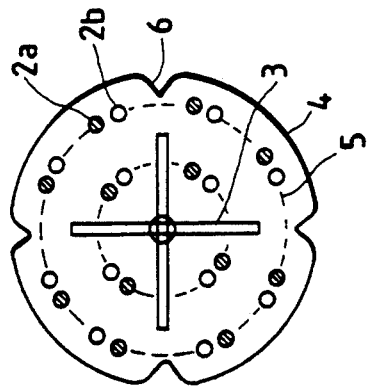

APPARATUS FOR UNIFORM MIXING OF SOLUTIONS

This is a continuation of application No. 07/628,127, filed Dec. 17, 1990, now abandoned.

BACKGROUND OF THE INVENTION

The present invention relates to an apparatus for mixing two or more solute-containing solutions into a uniform solution system. The invention also relates to an apparatus in which two or more solute-containing solutions are mixed uniformly to cause a chemical reaction to occur, yielding a reaction product. The invention further relates to an apparatus for producing silver halide (hereinafter abbreviated as "AgX") emulsion grains which are useful in the photographic industry. The invention also relates to an apparatus for chemically sensitizing said AgX emulsion grains. The invention further relates to an apparatus for adding solutions of photographically useful additives to an AgX emulsion. The invention also relates to an apparatus for producing AgX emulsions, having a capacity of at least 100 liters.

Mixing two or more solute-containing solutions into a uniform solution system is an important basic operation that is commonly employed in chemistry. Conventionally, this operation is performed by rotating agitating blades or a magnetic stirrer; these apparatus may be used either independently or in combination with baffle plates, a jet mixer, shaking or ultrasonic agitation.

Whether two or more solute-containing solutions can be efficiently mixed into a completely uniform system often determines if the reaction involved will proceed smoothly; in addition, it can also influence the yields of the reaction product and by-products. Consider, for example, a reaction between two liquid phases. This chemical reaction occurs under the least favorable conditions for uniform mixing with stirring. In such a reaction, solutes A and B dissolved in the two liquid phases contact only at their interface to enter into the reaction. Since the resulting reaction product L is not eliminated from the interface, a high concentration of the reaction product is produced in the neighborhood of the interface. As a result, the intended reaction $A+B \rightarrow L$ no longer takes place. Instead, undesired side reactions $L+A \rightarrow LA$ and $L+B \rightarrow LB$ occur, increasing the yields of the by-products. If the procedure of mixing two liquid phases is not effectively performed to produce a uniform solution system, the reaction rate is generally reduced; and, at the same time, the yield of the main reaction product decreases whereas the yields of unwanted by-product increases.

Therefore, in a generalized chemical reaction for producing products L, M, N, ... from reactants A, B, C, ... in solution, the added reactants must be rapidly agitated to create a uniform mixture system. This is particularly important if the chemical reaction concerned is irreversible. In general, the chemical reaction rate is generally proportional to the concentrations of reactants; in addition, the higher the temperature, the faster the reaction rate. Hence, the reaction rate is high in the region of high solute concentration near the inlets where the solute-containing solutions are added. The heat generation accompanying the reaction will further increase the reaction rate, and cause the reaction to proceed at increased rates in certain areas. In a reversible reaction system, such an imbalance in the reaction is effectively corrected since it proceeds in opposite direction after a uniform mixture forms. However, in an irreversible reaction system, the rate of reverse reaction which occurs after the formation of a uniform mixture is so slow that the non-uniform reaction product that results from the local high-speed reaction will often remain unremoved.

Consider, for example, a reaction for producing AgX emulsion grains from a silver salt and a halide salt (which is hereinafter abbreviated as an "$X^-$ salt". When a silver salt and/or $X^-$ salt solution is added to the solution in a reaction vessel (which is hereinafter called the "vessel solution"), the concentration of the added solution is very high in the neighborhood of the inlet through which it is added. It usually takes a considerable time for the added solution to be uniformly mixed with the entire vessel solution, and, as a result, the following various disadvantages occur:

(1) A silver halide, for example, AgBr in aqueous solution, has solubility product of $1.58 \times 10^{-11}$ mole$^2$/l$^2$ at 60° C. However, the aqueous solutions of AgNO$_3$ and NaBr which are added to the vessel solution usually have concentrations in the range of $10^{-1}$ to 3 moles/l, so the degree of supersaturation compared to the equilibrium concentrations of the solutes in solution is as high as $10^4$–$10^6$ in the neighborhood of the inlets for their addition. As a result, the reaction represented by the formula $AgNO_3 + KBr \rightarrow AgBr + KNO_3$ will proceed at an extremely high rate around those inlets. The rate of this reaction is proportional to the solute concentrations which in turn are dependent on the degree of agitation; therefore, the rate of the reaction is largely dependent on the degree of agitation of the vessel solution.

Stated more specifically, with reference to the stage of nucleation, the number or size of the nuclei formed and the occurrence of twinned faces and defects such as dislocations will depend on the degree of supersaturation in the vessel solution. Therefor, the characteristics of those nuclei will largely depend on the degree to which the vessel solution is agitated. In other words, the size and shape of the resulting AgX grains will largely depend on the degree of agitation in the vessel solution. This dependency deteriorates the consistency of AgX emulsion produced with small equipment at the laboratory scale and even more with plant facilities for large-scale production on a commercial basis. This problem is particularly great in the production of monodispersed parallel double twinned grains described in Japanese Patent Application No. 315741/1988; in such a process it is important to adjust the degree of supersaturation during nucleation.

(2) If, during the growth of mixed crystals consisting of at least two of AgCl, AgBr and AgI, unevenly mixed solutions of $X^-$ salt and silver salt undergo a non-uniform reaction in the neighborhood of the inlets through which the solutes are added, heterogeneous mixed crystals will form. The contents of $Cl^-$, $Br^-$ and $I^-$ will not be uniform either in the grains or between the grains.

(3) In the case of light-sensitive AgX grains, the reduction sensitized silver nuclei that form in those grains during their growth contribute to higher sensitivity; but, on the other hand, they cause nonuniform reduction sensitization. The formation of reduced silver nuclei on AgX grains in the same vessel solution is accelerated in areas having high $Ag^+$ concentrations, so that the non-uniform formation of reduced silver nuclei is promoted in the neighborhood of the inlet through which AgNO₃ is added.

In the three cases described above, the non-uniform reaction, once it occurs, causes the AgX grains to keep growing, so the product of such non-uniform reaction will remain immobilized in the AgX grains under the usual temperature conditions ($\leq 100°$ C.).

Another case that requires two or more solutions to be mixed rapidly and uniformly is the chemical sensitization of AgX emulsions. The process of chemically sensitizing AgX emulsions usually involves adding $10^{-5}$ to $10^{-7}$ moles of chemical sensitizers to one mole of AgX emulsion heated at 40°–80° C. and performing chemical ripening for a period of from about 5 to 50 minutes. In this case, silver sulfide and/or gold sulfide forms rapidly in areas where the chemical sensitizers are added, causing chemical sensitization nuclei to form unevenly between AgX grains. As a result, disadvantages occur: first, the photographic sensitivity differs between individual grains, so that no contrasty image can be obtained; second, the desired interimage effect cannot be obtained in such a multi-layered system. It is therefore necessary to develop an apparatus that allows two solutions to be mixed uniformly and rapidly.

Uniform mixing is also required when adding photographically useful additives to AgX emulsions. In such reactions the additives undergo an irreversible reaction with the AgX emulsion grains (particularly in the case of reaction with foggants or reduction sensitizers).

To overcome the aforementioned disadvantages, various efforts have been made to modify the methods for adding solutions of reactants (which are hereinafter sometimes referred to as "solute solutions") or mixing them with vessel solutions under agitation. In early versions of the apparatus for producing AgX emulsion grains, solutions of reactants were added through tubes to form cascades that fell on the surface of the vessel solution. This method, however, was not very effective since the area near the surface of the vessel solution was not usually as thoroughly agitated as the other areas. When agitating blades were installed near the surface of the vessel solution to mix the added solute solutions under rapid agitation, extensive foaming occurred which deteriorated, rather than improved, the efficiency of agitation. The resulting foam, although being part of the vessel solution, was hardly mixed under agitation. The method was also disadvantageous because the solute solutions, when added in cascade form, also caused foaming in the vessel solution. Attempts were made to improve the efficiency of agitation by injecting the solute solutions into areas near the agitating blades in the vessel solution (directly adding them into the vessel solution) through addition tubes having outlets located near the agitating blades in the vessel solution. For details of these improvements, reference may be had to the description in JP-B-55-10545 (the term "JP-B" as used herein means an "examined Japanese patent publication"), U.S. Pat. Nos. 3,785,777, 3,790,386, 3,692,283 and 3,415,650.

The methods described in the above patents improve efficiency, but they still suffer from the same disadvantages as the previous methods: concentrated laminar flows of the reactant solutions flowing out of the addition tubes cause a non-uniform reaction in the vessel solution, and it takes considerable time for the added solutions to be uniformly mixed with the vessel solution. Further, in commercial production at plants where larger diameter addition tubes are employed, the added solute solutions flow out as laminar flows having greater cross sections, which also causes a non-uniform reaction in the vessel solution. In addition to the above-described contrivances, those directed to modifying the shape of agitating blades and the positions where they are installed, as well as the use of baffle plates as agitating means have been proposed and are well known in the art.

Each of the attempts previously made to solve the aforementioned problems of the prior art is based on analyses of macroscopic phenomena that accompany agitation (e.g., the state of liquid flows, the size and magnitude of turbulence, the quantity of flows delivered, and power consumption); none of them have resulted from studies at the atomic or molecular level. For example, Buche proposed in 1938 that, to proportionally enlarge an agitation tank while holding the velocity constants for dissolution, extraction, heat transfer, etc. in the reaction vessel constant, "the enlargement be effected in such a way that the power consumption per unit volume of the solution is the same". In 1951–1952, Rushton made a proposal, developing this conclusion, but it was not directly related to the idea of agitation for producing a uniform mixture at the atomic or molecular level. In fact, the above-described problems with the process of uniform mixing under agitation still remain unsolved even today. For more detailed discussions of these problems, reference may be had to "Kagaku Kogaku Binran (Handbook of Chemical Engineering", ed. by The Society of Chemical Engineers, Japan, Chapter 20, Maruzen (1988), "Kongo oyobi Kakuhan (Mixing and Agitation)", edited by T. Misawa, Kagaku Kogyosha (1989), and "Shinjikkenkagaku Koza (A New Course in Experimental Chemistry)1", Kihon Sosa (Basic Operations)II, Section 5-2, Maruzen (1975).

If one attempts the uniform mixing process described above by merely relying upon agitating blades, vigorous agitation is necessary. This can damage AgX grains and produce AgX emulsions that will experience extensive fogging during development.

SUMMARY OF THE INVENTION

The present invention provides an apparatus that completely solves the aforementioned problems of the prior art by "uniformly mixing two or more solutions".

An object of this invention is to provide a new apparatus with which two or more solute-containing solutions can be rapidly and uniformly mixed.

Another object of this invention is to provide an apparatus that permits two or more reactant-containing solutions to be added and mixed uniformly to produce a reaction product, while at the same time reducing the occurrence of non-uniform reactions.

A further object of this invention is to provide an apparatus that permits a silver salt and/or X⁻ salt solution to be uniformly added and mixed with a vessel solution to initiate a reaction for producing AgX emulsion grains. This apparatus insures consistent production of AgX mixed-crystal grains that have a highly uniform halide composition, can be subjected to uniform reduction sensitization, are controlled in the number of defects such as twinned faces and dislocations or that are completely free of such defects, are uniformin shape, and are highly monodispersed; therefore producing AgX emulsions having high sensitivity and image quality.

Yet another object of this invention is to provide an apparatus that permits a solution of a chemical sensitizer to be uniformly added and mixed with an AgX emulsion, thereby producing an emulsion composition with improved uniformity in the chemical sensitization of emulsion grains as well as with enhanced sensitivity and image quality.

A further object of this invention is to provide an AgX emulsion that is improved in the "controllability of AgX emulsion grains in terms of the number of chemical sensitization nuclei formed per unit area ($cm^2$) of a single AgX grain and/or at the site of their formation".

A still further object of this invention is to provide an apparatus with which solutions containing additives useful for AgX photography can be uniformly added and mixed with AgX emulsion, producing an emulsion composition with improved uniformity in the photographic characteristics of individual emulsion grains, as well as with enhanced sensitivity and image quality.

Another object of this invention is to provide an apparatus for producing AgX emulsions that solves the heretofore encountered problem of disparity between the characteristics of AgX emulsions produced by small-scale equipment for laboratory use and those produced by large-scale facilities for commercial use that have vessel capacities of 100 liters or more.

The above-stated objects of the present invention can be attained by the following:

(1) An apparatus in which one or more solute-containing solutions are added to a solution or a colloidal suspension that are stirred in a reaction vessel in which the two solutions are to be mixed uniformly, which apparatus is characterized in that one or more of the solute-containing solutions are added directly to the solution or colloidal suspension through a porous member located in said solution or colloidal suspension.

(2) An apparatus as recited above in which said porous member is a porous membrane.

(3) An apparatus as recited in (1) or (2) which is a chemical reaction product producing system in which the solute in one of said solute-containing solutions in said reaction vessel reacts with the solute in said solution or colloidal solution in the vessel and/or at least one other solute in the solutions added, thereby producing a reaction product.

(4) An apparatus as recited in (3) wherein said solution or colloidal suspension in the reaction vessel contains at least a dispersion medium and water, one of the solute-containing solutions to be added contains at least a silver salt and water, another solute-containing solution to be added contains a halogenated material and water, and said reaction product is silver halide emulsion grains.

(5) An apparatus as recited in (3) wherein said solution or colloidal suspension in the reaction vessel contains at least a dispersion medium, water and silver halide emulsin grains, said solute-containing solutions contain at least a chemical sensitizer, and said reaction product is chemical sensitization nuclei on silver halide grains.

(6) An apparatus as recited in any one of the preceding paragraphs (1)–(4) wherein said reaction vessel has a capacity of at least 100 liters.

(7) An apparatus as recited in any one of the preceding paragraphs (1)–(5) wherein said porous member or membrane is a hollow tube type porous membrane.

(8) An apparatus as recited in (6) wherein said hollow tube type porous membrane is made of an organic high-molecular weight elastomeric material.

The present invention provides an apparatus for producing an AgX photographic emulsion of adding a silver salt solution and an $X^-$ salt solution to a vessel solution containing at least a dispersion medium and water; and, this apparatus is characterized in that the silver salt solution is introduced through a porous membrane placed in said vessel solution. Compared to a prior art apparatus that adds solute solutions through a single tube, the apparatus of the present invention has at least one of the following ten advantages.

(1) As is clear from eq. (2), by reducing the pore size to a value which is one n-th (1/n) of the initial level, the total area of the outlet for added solution can be increased by a factor of $n^2$ if the operating pressure and flow quantity are the same. Hence, the outlets for added solution can be extensively distributed within the vessel solution. Further, the solute solutions are added as small droplets, so the specific surface areas of the droplets are sufficiently large to enhance the molecular diffusion effect.

(2) In the conventional practice of producing AgX emulsions by the same formula, the characteristics of emulsions prepared by small-scale production rarely agree with those of emulsions prepared by large-scale production; and, modifications of the formula are often required. On the other hand, with the present invention, solute solutions may be mixed in a very uniform manner so that only small differences will occur in the characteristics of emulsions whether prepared by small-scale or large-scale production. This effect is particularly great with apparatus having a vessel capacity of 100 l or more. Hence, the present invention offers the advantage that small-scale production of emulsions in the laboratory can be readily expanded to large-scale production at plants without introducing any substantial differences in the characteristics of the emulsions produced. Whether at a small or a large scale, solute solutions are added through porous membranes having the same pore size, so that liquid masses of the same size will always be added to the vessel solution. Another factor that contributes to the success of the present invention is that the initial stage of the process for accomplishing uniform mixing depends on molecular diffusion, which is governed by apparatus constants. A further advantage is that the consistency of production with the same apparatus is so high that the products obtained are less subject to variations in quality from one lot to another.

(3) The porous membrane used in the present invention is immersed in the vessel solution, so its temperature is substantially the same as the temperature of that vessel solution. Solute solutions added will flow at slow speed as they collide against the inner side surface of small pores in the porous membrane and this contributes to good efficiency of heat exchange. Accordingly, the solute solutions added have a temperature that is close enough to the temperature of the vessel solution to provide a very uniform temperature distribution in the vessel solution.

(4) Since solute solutions are added very uniformly, they can be used as highly concentrated solutions without impairing the consistency of production of causing aggregation of the product emulsions. Accordingly, the present invention permits the use of highly concentrated solute solutions. If the capacity of the reaction vessel used is the same, the yield of AgX emulsions per unit capacity can be increased; and, accordingly, the overall production cost can be reduced.

(5) The formation of AgX nuclei originates from the resulting uniform mixture of Ag+ and X− ions, so the degree of supersaturation will have a very uniform profile during the formation of AgX nuclei. This allows the degree of supersaturation to be set at a very low level during nucleation and, when applied to the formation of nuclei of the completely untwinned grains described in Japanese Patent Application No. 223739/1988, it offers the advantage of producing a more ideal form of completely untwinned grains. During the formation of nuclei for fine-grain emulsions or high-iodine nuclei, the degree of supersaturation tends to increase, increasing the chance of introducing defects. However, this problem can be eliminated with the present invention. If the present invention is used in the formation of the tabular grains described in Japanese Patent Application No. 315417/1988, it becomes possible to form tabular emulsion grains that have a higher proportion of parallel double-twinned grains and a higher degree of monodispersity.

In preparing tabular fine-grain emulsions, in particular, parallel double-twinned emulsions having a high degree of monodispersity, Ag+ and X− salt solutions must be added at low temperatures (normally 10°–50° C., preferably 15°–40° C.), for short periods of time (no longer than 2 minutes, preferably 5–60 seconds), and at high rates ($2 \times 10^2$–1 mol/l, preferably 0.08–1 mol/l). Under these conditions, completely uniformmixing with agitation cannot be accomplished using the prior art apparatus. However, in the present invention, solute solutions are finely divided as they are added, so they are already uniformly mixed at the time they are added to the vessel solution. Hence, even under the conditions described above, the present invention enables solute solutions to be uniformly mixed to a satisfactory extent. Accordingly to the present invention, fine-grain emulsions having the following characteristics can be prepared; the average diameter of the projected image of an equivalent circle, 0.6–0.2 μm, preferably 0.4–0.2 μm; average aspect ratio, 1 or more, preferably 2–7; yield, 0.05–1 mol/l, preferably 0.2–1 mol/l; coefficient of variation, 30% or less, preferably 20% or less; halide composition, AgBrI with up to 10 mol % Cl and the I content being in the range of from zero to the solid solubility limit.

In the prior art practice of producing tabular grains, especially parallel double-twinned grains, the proportion of unwanted non-tabular grains tends to increase with the increasing iodine content. However, in accordance with the present invention, uniform mixing of solute solutions can be accomplished to produce tabular AgBrI grains having the following satisfactory characteristics: I− content in the range of from 0 mol % to the solid solubility limit, preferably 5 mol % to the solid solubility limit; proportion of the projected area of tabular grain, 90% or more, preferably 97–100%; average aspect ratio, 2 or more, preferably 2–20%; Cl content, 10 mol % or less; coefficient of variation of the grain size distribution (C.V.), 30% or less, preferably 20% or less; and the average diameter of the projected image of an equivalent circle, 0.4–4 μm, preferably 0.6–2.5 μm.

(6) When the interior or bulk of AgX grains is to be reduction sensitized, the present invention permits the reduction sensitization to proceed uniformly, producing high-speed negative emulsions. If, on the other hand, the reduction sensitization reaction is to be inhibited, the present invention insures complete inhibition, yielding high-speed direct reversal emulsions. In the case of reduction sensitization, the distribution of the amount of reduced silver varies from grain to grain by a coefficient that is preferably 30% or less, more preferably 20% or less, and most preferably 10% or less.

(7) In distributions of the Cl−, Br− and I− concentrations in the vessel solution, the mixed crystal composition within the resulting AgX grains and between those grains becomes non-uniform, as is expected from the solubility product of those ions. In accordance with the present invention, the concentrations of Cl−, Br− and I− in the reaction solution are more uniform than in the prior art, yielding mixed-crystal AgX grains having a more uniform composition.

(8) In accordance with the present invention, a local increase in the concentration of a solute forming new nuclei can be avoided, so the degree of supersaturation of the vessel solution taken as a whole can be made more uniform. Hence, crystal growth can be accomplished by a mechanism in which diffusion-controlled growth is predominant. As a result, AgX emulsion grains having a narrower grain size distribution can be obtained.

(9) When chemical sensitization of an AgX emulsion is performed using the apparatus of the present invention, no local increase in the concentration of the chemical sensitizer used will occur; instead, all grains in the AgX emulsion are subjected to uniform chemical sensitization, yielding a contrasty, high-speed AgX emulsion. Japanese Patent Application Nos. 223739/1988 and 315741/1988 describe "grains that are controlled with respect to the number of chemical sensitization nuclei per square meter on a single AgX grain and/or the site where the nuclei are formed". The AgX emulsion prepared in accordance with the present invention is further improved with respect to such control.

(10) The present invention is also applicable to the addition of photographically useful addenda and solutions containing such addenda can be uniformly added to and AgX emulsion, whereby AgX emulsion grains having reasonably balanced photographic characteristics can be prepared.

The apparatus of the present invention for mixing two or more solutions uniformly is described below in detail with reference being chiefly made to a typical case using the apparatus as a chemical reactor for producing AgX emulsion grains. It should, however, be noted that this is by no means the sole embodiment of the present invention.

BRIEF DESCRIPTION OF THE DRAWINGS

FIG. 1 shows two examples of connection between a hollow tube type porous membrane and a fluid supply pipe.

FIG. 5 shows an embodiment in which hollow tube type porous membranes for addition of $Ag^+$ and $X^-$ salt solutions are provided in every part of a reaction solution;

FIG. 6 shows an embodiment in which a mixing box is provided in a reaction solution, with a hollow tube type porous membrane being placed on the bottom of said mixing box;

DESCRIPTION OF THE PREFERRED EMBODIMENTS

1. Apparatus for producing AgX emulsions

Figure 2:
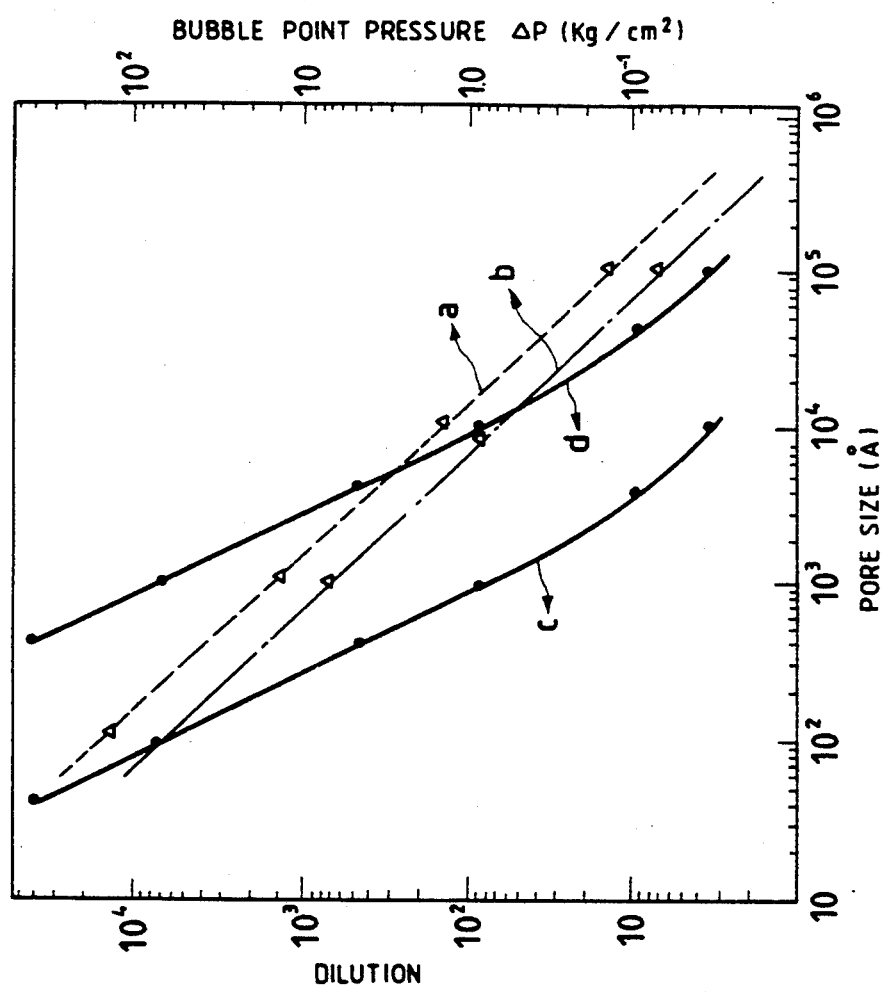
FIG. 2 is a graph showing the relationship between the pore size and the bubble point pressure ΔP or the degree of dilution; dotted line a in FIG. 2 shows the relationship between the pore size $\phi$(Å) of a porous membrane and the bubble point pressure ΔP (kg/cm$^2$) in an aqueous solution; the area between dotted lines a and b shows the relationship between the two parameters in an aqueous solution of gelatin (which varies with the concentration of gelatin); solid line c shows the relationship between the pore size of a porous membrane and the degree by which the solute solution added through pores in the membrane is diluted within $10^{-4}$ second by molecular diffusion; and solid line d shows the relationship between the same parameters for the case of dilution within $10^{-2}$ second.

The apparatus of the present invention for producing AgX emulsions has at least water and a dispersion medium contained in a reaction vessel, and a silver salt and/or $X^-$ salt solution is added through a porous member into the vessel solution under agitation, with said porous member being located within the solution of said dispersion medium. The porous member may be located above the surface of the vessel solution but in that case the salt-containing solutions can only be added over the surface of the vessel solution. If, on the other hand, the porous member is installed within the vessel solution, the salt-containing solutions can be added in such a way that they spread extensively in the vessel solution. In this respect, the porous member is preferably located within, rather than above, the vessel solution. The following description is therefore directed to the case where the porous member is installed within the vessel solution.

The porous member is first described below.

A. Porous member

The "porous members" used in the present invention can morphologically be classified into the following two groups.

I. Porous membranes that are generally called "filters" and which are classified by pore size into three types, those for superfiltration ($\leq 10$ Å in diameter), those for ultrafiltration ($10$–$10^4$ Å), those for microfiltration ($200$–$10^5$ Å), and those for filtration ($>10^4$ Å).

II. Elongated hollow fine tubes each having only one outlet.

The "porous member" as typically used in the present invention is in class I but those in class II can also be used since the combination of fine tubes with a smaller pore size will achieve similar results to porous members of class I if the number of those tubes is sufficiently increased. However, porous members of class I are preferred since they allow for a greater flow quantity with a small pore size, thus permitting solutions to be added in a more efficient manner. In practice, porous members cannot be clearly distinguished as to which class they belong. For example, a filter membrane composed of hollow fibers and a tube having many holes in the side wall may fall into either class. Hence, class II shall refer to fine tubes each having only one outlet, whereas tubes each having two or more outlets shall be considered to fall in class I.

The porous member to be used in the present invention has at least 4, preferably at least 10, more preferably $30$–$10^{15}$, and most preferably $100$–$10^{10}$, pores in the vessel solution per solute solution to be added. The number of small pores in a porous member can be determined by counting the number or pores present in unit area under examination with an optical or electron microscope.

The pore size of the porous member to be used in the present invention is no greater than 5 mm in diameter, preferably no greater than 2 mm, more preferably in the range of $10$–$5 \times 10^6$ Å, particularly preferably in the range of $10^2$–$10^6$ Å, and most preferably in the range of $3 \times 10^2$–$10^5$ Å. The term "pore size" as used herein means the diameter of a circle having the same area as a pore of interest. The smaller the size of a pore, the smaller the liquid mass of a solute solution that flows out of the pore, and the added solute solution is already mixed uniformly with the vessel solution as soon as it flows out of the porous member, which is preferred for the purposes of the present invention. However, porous membranes for use in superfiltration which have pore size smaller than 10 Å are generally categorized as semipermeable, dialysis or reverse osmotic membranes, permitting the passage of small molecules such as $H_2O$, but not larger molecules. In the present invention, those membranes permit free passage of low-molecular weight $H_2O$ in an aqueous solution of $AgNO_3$ but permit little or no passage of $Ag^+NO_3^-$ (hydrated). This is not preferred for the purposes of the present invention since reactants will not be supplied, as intended, into the vessel solution. Hence, the pore size of the porous membrane to be used in the present invention is preferably in such a range that the molecules of both the solvent and the solute in a solution to be added can pass through pores with substantially the same efficiency, and this requirement is satisfied by pore size ranges that are usually called the "ultrafiltration range", "microfiltration range" and "filtration range". If the pore size at the outlet is greater than 2 mm, particularly if it is greater than 5 mm, a larger liquid mass of added solution will flow out of the porous member, thereby creating a very poorly mixed condition at the point where uniform mixing by agitation should start. This is undesirable since non-uniform reaction is particularly likely to occur in areas around the liquid mass of a flowing added solution. The pore size range of $10$–$10^4$ Å is preferred since the molecular diffusion term is increased as will be discussed below.

The pore size distribution is preferably as small as possible because this permits the added solute solution to flow out of all pores uniformly and at the same time, so $\Delta P$, which will be described below under C. (i), can be adjusted more smoothly. The pore size distribution as expressed by coefficient of variation (C.V.) is preferably 60% or below, more preferably 30 or below, most preferably 20% or below.

The pores in the porous member may be cylindrical, elliptic or polygonal (from triangular to circular) in shape. If desired, the pores may be slits that are similar in shape to the cuts made with a razor blade. Such slits may be regarded as a linear array of holes having a diameter equal to the width of slits and the number of holes can be approximated by the length to width ratio of each slit.

It is preferred that the pores be extensively distributed within the reaction vessel. This insures that, at the time reactant-containing solutions are added, they are already present in every part of the vessel solution, creating a uniform mixture. In order to have the pores distributed as widely as possible, part of the porous membrane may be treated with an organic high-molecular weight material, etc. to fill and coalesce pores in the membrane, or its surface may be coated with the high-molecular weight material, etc. to close some of the pores.

The degree of scattering (SC) of pores may be quantitatively expressed by the following equation:

$$SC = \sum_{n=1}^{n} \sum_{j=1}^{n} [(x_i,y_i,z_i) - (x_j,y_j,z_j)]^2 \quad (1)$$
$$= \sum_{i=1}^{n} \sum_{j=1}^{n} [(x_i - x_j)^2 + (y_i - y_j)]^2 + (z_i - z_j)^2$$

where $(x_i, y_i, z_i)$ are coordinates that designate the central position of the ith pore in the vessel solution. The broadest pore distribution is attained at a peak value of SC. When the number of pores is constant, the maximum value of SC is given at the point where $d(SC)/d(x_i,y_i,z_i)$ is zero. The pores are preferably located in the vessel to provide at least 0.1%, more preferably at least 1%, most preferably at least 10%, of the maximum SC value for a given number of pores. However, no pores should be located in areas close to the surface of the vessel solution, (within 1 cm of said surface) where foaming often occurs.

The basic operating principle of the apparatus of the present invention is as follows. Compared to the case where a reactant-containing solution is added through a single tube having an area of 5 mm² at the outlet, the use of n tubes each having the same area at the outlet insures about n times more uniform mixing at the tube outlet. Hence, the most ideal case of the present invention is where the number n is increased to infinity. Stated more specifically, this corresponds to the case where pores with sizes on the atomic or molecular order are distributed within the vessel solution to insure that the added solute solution already experiences uniform mixing at the atomic or molecular level in areas close to the outlet of addition tubes. In any event, compared to the conventional case where solute solutions are added through tubes each having one outlet per solute solution (the tubes have outlet diameters ranging from 3 mm to 3 cm depending on the size of the reaction vessel), the apparatus of the present invention, which permits solute solutions to be added through a porous member having many small holes, insures that almost uniform mixing is already accomplished at the outlet where the added solution emerges from the porous member.

If a pore is approximated by a fine cylindrical tube having an inside radius r and a length l, the quantity of viscous flow (laminar flow) moving through this tube can generally be expressed by the following Hagen-Poiseuille equation:

$$Q(\text{ml/sec}) = \frac{\pi r^4(P_1 - P_2)}{8\eta l} = \frac{Ar^2(P_1 - P_2)}{8\eta l} \quad (2)$$

where $P_1$ and $P_2$ are the pressures at the inlet and the outlet, respectively, of the tube, and $\eta$ is the viscosity of the flow. Equation (2) shows that as the pore diameter decreases, Q decreased by a greater degree than the cross-sectional area (A) of the pore. For example, if the pore radius is r/n, Q decreases to $A/n^2$. This is because the tube is stationary and causes the outflow of added solution to be subjected to a greater drag along the tube wall. However, equation (2) also shows that if the pore diameter is reduced to one nth (1/n) of its initial value in the region where eq. (2) is valid, the area of the outlet for the added solution can be increased by a degree equivalent to the square of n in an addition system involving the same operating pressure and the same quantity of flow added. This is favorable for the system contemplated by the present invention since the result obtained is close to an ideal state in which the area of each outlet for the solute solution is increased; and, such outlets are scattered distributed as broadly as possible to insure uniform mixing at the molecular level in areas near the outlet for the added solution.

In practice, however, the reaction vessel is of a limited size and the area of the outlet for the added solution cannot be increased indefinitely, thereby making it impossible to increase the flow quantity in an unlimited way. However, the relationship expressed by eq. (2) may still be utilized. According to eq. (2), the flow quantity is in inverse proportion to the length of the fine tube. Thus, one may shorten the tube in order to increase the flow quantity. Conventional addition tubes have a length of 25-35 cm in small-scale (ca. 2-5 l in capacity) apparatus for producting AgX emulsions in the laboratory. With porous membranes, the value of l can be reduced to the range of ca. 20 μm-2 cm if they are of a symmetric type although the exact value depends on the constituent material of a specific membrane. The lower limit of l is chiefly determined by the strength of the porous membrane used. The upper limit is determined by consideration of the fact that an overly thick membrane is bulky and too difficult to handle in the reaction vessel. A more preferred range of l is from ca. 50 μm to 0.5 cm.

The use of a porous membrane of the Loeb type, which has an asymmetric structure, is preferred since l can be further reduced. A Loeb type membrane has a structure in which a porous membrane having larger pores is overlaid with a membrane having smaller pores. The larger-pore membrane is thick and imparts strength to the overall structure, while the smaller-pore membrane is thin and serves as a microporous membrane layer, which reduces l in eq. (2). The two-layer structure may be composed of two membranes of the same material (e.g. an organic high-molecular weight material) or it may be composed of different materials (e.g. a ceramic membrane combined with an organic high-molecular weight membrane). In the two-layer membrane first fabricated by Loeb, the support layer had a thickness of 100-200 μm, whereas the thin layer (hereinafter referred to as an "active layer") was 0.1-0.25 μm thick.

In the present invention, the thickness of each layer can be selected as appropriate for the specific use of the apparatus. In this case, the thickness of each layer is chiefly governed by the overall strength of the membrane. It is usually preferred that the active layer have a thickness of a least 0.05 $\mu$m, with the range of 0.1–100 $\mu$m being more preferred. The thickness of a symmetric membrane and that of an asymmmetric membrane consisting of a support layer and an active layer are each preferably at least 20 $\mu$m, with the range of 50 $\mu$m–2 cm being more preferred. A particularly preferred range is from 100 $\mu$m to 0.5 cm in each of the symmetric and asymmetric membranes. In whichever case, porous members of class I are preferred over those of class II because the decrease in flow quantity which occurs when the pore size is reduced can be effectively compensated by reducing l in eq. (2), thus permitting a further decrease in the pore size.

In the case of porous members in class II, the length (l) of a fine tube is usually on the order of 50–300 cm with a reaction vessel having a capacity of ca. 300 l. If a multiple of such tubes are employed, various lengths of tubes can be combined in order to insure that outlets for added solutions are located in every part of the vessel solution. In this instance, the quantity of flow through long tubes can be matched with that of flow through fine tubes by adjusting the thickness of each tube in accordance with eq. (2). If necessary, tubes each having multiple branch tubes may be employed; this offers the advantage that outlets for added solutions can be uniformly distributed in the vessel solution more easily than porous membranes, thereby increasing the value of SC in eq. (1). In using such tubes having multiple branch tubes, the main tube may be thick enough to minimize pressure loss whereas the diameter of each branch tube providing an outlet for the added solution is made smaller than the thickness of the main tube.

In order to compensate for the decrease in flow quantity that will occur when the pore diameter is reduced, the pressure for forcing out the solution being added (i.e., $\Delta P$ corresponding to $P_1-P_2$ in eq. (2)) may be increased. The value of $\Delta P$ that can be adopted is usually no more than 50 kg/cm$^2$, preferably in the range of 0.1–20 kg/cm$^2$, more preferably in the range of 0.3–10 kg/cm$^2$. For safety reasons, $\Delta P$ should not exceed a certain limit since the added solution can be forcefully expelled if the membrane ruptures. A leaking solution of AgNO$_3$ is particularly dangerous.

It is usually preferred that the flow quantity of a solution being added is at least 0.1 ml/min per liter of the vessel solution, with the range of 0.3–200 ml/min being more preferred. A particularly preferred range is from 1 to 100 ml/min per liter of the vessel solution.

Since the apparatus of the present invention permits uniformmixing at a fast rate, large volumes of Ag$^+$ salt and X$^-$ salt solutions can be added within a short period of time. It is particularly notable that the apparatus enables homogeneous AgX grains to be produced even if the addition rate is 50 ml/min or more, preferably in the range of 100–200 ml/min.

With the addition method described above, high addition precision and large $\Delta P$ can be insured even in the range of small flow quantities (0.1–3 ml/min) and this offers the advantage that none of the reaction solution will flow back to the solution being added. This may be explained as follows. The chemical potential difference ($\Delta \mu_i$) of solutions between two phases of solution separated by the porous membrane under consideration is expressed by:

$$\Delta \mu_i = -S_i \Delta T + V_i \Delta P + Z_i F \Delta \psi + RT \ln C_i \qquad (3)$$

where $\Delta \mu_i$ is the difference in chemical potential of a material i between the two phases, $\Delta T$ is the temperature difference, $\Delta P$ is the pressure difference, $\Delta \psi$ is the electric potential difference, $C_i$ is the concentration difference of material i, $S_i$ is the partial molar entropy, $V_i$ is the partial molar volume, $Z_i$ is the number of electric charges, F is the Faraday constant, and R is the gas constant. When P on the solution to be added is increased, the chemical potentials of both solute ions and the solvent molecule in that solution also increase, causing material transfer from the solute solution to the vessel solution, but the solutes or solvent are not likely the flow back from the vessel solution to the solution being added. With the use of the porous membrane, the open areas of the outlet for addition will increase and yet the backflow of the solutes or solvent will not readily occur since $\Delta \mu_i/\Delta x$ between the two solutions separated by the porous membrane is sufficiently large, $\Delta x$ being the distance between the two solutions. Hence, the thickness of the porous membrane, l, is preferably small to prevent the backflow of solutes and solvent in the small flow quantity range.

The porous member to be used in the present invention preferably satisfies the following requirements: (1) they should be corrosion-resistant, not reacting with solute solutions or the vessel solution; (2) they should be stable under various temperature conditions (which usually range from 20° to 90° C.); (3) they should be stable in the pH range (usually between 2 and 10) of the vessel solution used in the production of AgX emulsions; (4) they should withstand high filter pressures (i.e., they should have great physical strength); and (5) they should permit the pore size and its distribution to be adjusted as desired. Useful constituent materials include: ceramics such as SiO$_2$, Al$_2$O$_3$, silica alumina, titanium oxide, SiC and mixtures thereof; metals that are either corrosion-resistant or form passive films, such as stainless steel, Al, Ti, aluminum alloys, Nichromes, platinum and gold; organic high-molecular weight materials that are classified as thermoplastic resins, thermosetting resins and elastomers and which are exemplified by ionomers, polyphenylene oxide, fluorine resins (e.g., Teflon), polysulfones, polyolefins (e.g. polyethylene and polypropylene), epoxies, polycarbonates, fluorine rubbers, vinyl ester resins, silicone rubber, bisphenolic unsaturated polyesters, furan resins, ethylene-propylene rubber, cellulosic derivatives, and protein molecules (e.g., hardened gelatin films); and composites consisting of two or more of the materials listed above. For details of the characteristics of the materials listed above, processes for producing them, methods of shaping them and methods of providing protection against corrosion, as well as for details of corrosion-resistant materials, reference may be had to the following: "Kagaku Sochi Binran (Hand-book of Chemical Apparatus"), ed. by A. Maruzen (1989); "Plastics Handbook", ed. by S. Murahashi et al., Asakura Shoten (1969); "Kagaku Binran (Chemical Handbook)", Oyokagaku-ken (Applied Chemistry), Chapters 12, 15 and 20, Maruzen (1986), "Atarashii Kogyo Zairyo (New Engineering Materials)", ed. by T. Sata et al., Morikita Shuppan (1986); and "Kobunshi Shinsozai One Point (One-point Lectures on New Polymeric Materials)", ed. by The Society of Polymer Science, No. 3, 6, 7, 8, 19, and 23 Kyoritsu Shuppan (1988–1989).

Chemicals have the following features and hence are preferably used as the constituent materials of the porous member:

(1) they are highly resistant to all corrosive liquids except fluoric acid and alkalies (pH > 11); carbonaceous ceramics are particularly resistant to alkali solutions;

(2) they are highly heat-resistant and withstand use up to 100° CC. without any thermal deformation or softening; because of small thermal expansion coefficients, they experience only small changes in pore size in the face of temperature variations;

(3) they permit fine pores to be formed that are distributed fairly uniformly and that have sizes within the range of ca. 0.1–600 μm;

(4) soft membranes will densify under pressure, causing the pores to become so small that it is difficult to increase the flow quantity, but ceramics are rigid and will not cause such problems; and (5) ceramics will not generate any dissolved matter that can contaminate the solute solutions or vessel solution.

In the case of apparatus for producing AgX emulsions, the component that contacts the reaction solution is preferably made of materials that will not produce metallic ions that can contaminate the reaction solution. For this reason, metal-free organic high-molecular weight materials are more preferred. Also preferred are corrosion-resistant materials that will not cause hydrolytic reaction in the pH range specified above. For the reasons discussed below, materials having rubber like elasticity are more preferred. Rubber-like elasticity is a mechanical property characteristic of thermoplastic resins, rubber materials and other high-molecular weight compounds having long chains of molecules. This property originates from entropy-related elasticity, which essentially differs from the energy-related elasticity observed in hard solid materials. The percent elongation at elastic limit of such materials is at least 0%, preferably at least 5%, more preferably 20–1000%, most preferably 80–800%. Such rubber elastomers are preferably those materials which will not release sulfur atoms or molecules that can adversely affect the photographic characteristics of AgX emulsion grains. Hence, it is preferred to use sulfur-free materials or materials which have previously been immersed in heated water to release the free sulfur.

Among various organic high-molecular weight materials, fluorine resins (e.g., poytetrafluoroethylene, vinylidene fluoride, ethylene-tetrafluoroethylene copolymer and ethylenefluoride-propylene), fluorine rubbers (e.g., vinylidene fluoride rubber, fluorosilicone rubber, tetrafluoroethylene-propylene rubber, fluorophosphazen rubber, and tetrafluoroethylene-perfluorovinyl ether rubber), and polyolefins are preferred for their heat resistance, corrosion resistance and functional capabilities.

For general information on porous membranes and specific examples of them, reference may be had to the following: R. Kondo, "Takou Zairyo (Porous Materials)", Gihodo (1973); "Roka (Filtration)", ed. by D. Misawa, Kagaku Kogyosha (1987); "Kobunshi Shinsozai One Point (One-Point Lectures on New Polymeric Materials)", ed. by The Society of Polymer Science, No. 6, Kyoritsu Shuppan (1988); "Maku Riyô Gijutsu Handbook (Membrane Technology Handbook)", ed. by H. Oya, Ko Shobo (1983); "Kagaku Binran (Chemical Handbook)—Oyohen (Applications)", ed. by The Chemical Soceity of Japan, Sections 8.10, 12.7, 15.10 and 16.6, Maruzen (1986); M. J. Matteson and C. Orr, "Filtration", Marcel Dekker, Inc., New York (1987); and Japanese Patent Application No. 78534/1990.

The various types of porous membranes that can be used in the present invention are further described below.

B. Types of porous membranes (i) Porous membrane made of bound fine particles

Ceramic particles, metal particles, organic high-molecular weight particles or composite particles thereof (e.g., metal particles coated with a synthetic organic high-molecular weight material) are fused together to form a porous membrane.

(ii) Porous membrane made of woven fabric

Under examination with an optical or electron microscope, a porous membrane made of a woven fabric has warp and weft yarns crossing each other in a grid pattern; the size of the square defined by the two warp yarns and the two weft yarns that cross them is equivalent to the pore diameter. Preferably, the warp and the weft are fixed at their crossing points by a suitable means such as a binder or fusion to minimize the possible variations in pore size during use.

(iii) Porous membrane made of nonwoven fabric

Exemplary nonwoven fabrics include pressed felts, synthetic fibrous felts, dry nonwoven fabrics and wet non-woven fabrics. A typical wet nonwoven fabrics is filter paper produced with a paper making machine.

(iv) Porous membrane in sheet form

Membrane filters having the smallest pore size are called "membrane filters" and pertain to a class of porous membranes that permit solutions of low-molecular weight materials to pass through the gap between high-molecular weight chains. The pore size in such membranous filters can be adjusted by controlling the mesh size of the high-molecular weight network.

Other examples of porous membranes in sheet form are cellulose acetate films that are produced by the following procedure: a film is formed by dissolution in a strong solvent; the film is immersed in a weak solvent to spheroidize the molecules, followed by a heat treatment to have the spheroidal molecules bound together as they are interlocked by protruding molecular chains. In this case, porous membranes having an average pore diameter of 0.1–10 μm can be formed depending on the solubilizing power of the weak solvent and the kind of heat treatment used.

Other porous membranes in sheet form include: polystyrene membranes containing a small amount of crosslinking divinylbenzene, porous membranes of pectin (polysaccharides with a hydrophilic long chain), silicate gel, rubber, aluminum hydroxide, polysulfones, polyvinylidene fluoride, polyamides, and polyethylene fluorides (e.g., tetra-, tri-, di- and monofluoroethylene), as well as ion-selective permeable membranes made of poly (sodium styrenesulfonate), acryionitrile copolymers and 12-nylon.

Also included within the class of porous membranes in sheet form are what are called "foams" in which membrane materials form a continuous phase having closed or open cells dispersed therein. Phase-separated glass porous membranes are another example.

(v) Microprocessed membrane

Holes can be made in organic high-molecular weight membranes by making use of the change in their solubility (due to such phenomena as modification, crosslinking, degradation, depolymerization and polymerization reaction) that is initiated by exposure to light (e.g. natural or available light, monochromatic light, laser light, synchrotron radiation, uv radiation and far uv radiation), X-rays, electron beams, charged particle beams or high energy rays. Because of the ease of production, photopolymers are most commonly used. Microprocessed membranes made of organic polymers are used not only in the printing industry but also in the precision processing of printing wiring boards and shadow masks and the microprocessing of VLSI semiconductor devices. From the viewpoint of microprocessability, resist films for use in the microprocessing of VLSI semiconductor devices are preferred for use in the present invention. Anisotropic etching using a reactive ion etching process is particularly preferred since it causes less spread in the transverse direction relative to the direction of the depth of a hole, thereby enabling precise processing.

In addition to organic resist films, inorganic resist films can also be used. Compared to the microprocessing of semiconductors, inorganic resist films permit more precise microprocessing because they have the following advantages: (1) once fabricated, they can be used repeatedly and hence permit the application of time-consuming methods such as electron beam writing; (2) there is no need to provide for protection against damage to semiconductors, so writing can be accomplished with high-energy charged particle beams, electron beams, X-rays, etc.; (3) holes to be formed need not always be perpendicular to the thickness of film and their diameter may increase in the direction of film thickness as long as the pore size is sufficiently small at the outlet for the solute solution added; and (4) because of the large distance between pores, there is no need to take into account the interaction and other effects that can occur during microprocessing.

Mesh screens commonly used as examination supports with an electron microscope are another example of microprocessed membranes. Such mesh screens are chiefly produced by chemical etching or electroforming. Shadow masks used in the CRT of color television sets are still another example, they are chiefly produced by photoetching.

In the present invention, photosensitive rubber is especially preferable since it has rubber elastomer characteristics as described above. The following materials are exemplfied: nitrile rubber, isoprene rubber, epoxidation polyisoprene, polymethyl methacrylate, and methacrylate based materials. The details thereof are seen in the references below.

The microprocessed membranes are particularly preferred for use in the present invention since they permit the production of porous membranes having precise pore sizes, pore-to-pore distance, pore size distribution and pore length in accordance with designed values. For details of the above-described resist materials, resist techniques, etching materials, etching techniques and microprocessing methods, reference may be had to the following: "Kagaku Binran (Chemical Handbook)—(-Ôyô Kagaku Hen (Applied Chemistry)", ed. by the Chemical Society of Japan, Section 14.4, Maruzen (1986); T. Nakano et al., Bisai Kakô, Tokyo Electric University Press (1989); K. Naraoka, Electronics no Seimitsu Bisai Kakô, Sôgô Densi Shuppansha (1980); "Maikuro Kakô Gijutsu (Microprocessing Technology)", ed. by the Editors Committee of Microprocessing Technology, Nikkan Kogyo Shinbunsha (1988); S. M. Sze, "VLSI Technology", Chapters 7 and 8, McGraw-Hill (1983); "Handôtai Prazuma Purosesu Gijutsu (Semiconductor Plasma Processing Technology)", ed. by T. Kanno, Sangyo Tosho (1985); "Kobunshi Shinsozai One Point (One-point Lectures on New Polymeric Materials)", ed. by the Society of Polymer Science, No. 3, Kyoritsu Shuppan (1987); "Handôtai Kenkyu (Studies of Semiconductors)", ed. by J. Nishizawa, Vol. 14–26, Kogyo Chosakai (1978–1987); and Japanese Patent Application No. 176392/1985.

Another examples of a microprocessed membrane is the nucleopore filter. The pores in nuceleopore filters are cylindrical and uniform in size. The flow characteristics of solutions added through nuceleopore filters are in substantial agreement with the values predicted from eq. (2). Nucleopore filters have a narrow pore size distribution and the density of pores present can be adjusted by controlling the density of charged particle beams to which the filters are exposed. Nucleopore filters are commercially available with the pore size ranging from 0.01 to 15 $\mu$m, and the commercial products are either hydrophobic or hydrophilic depending upon the type of surface treatment adopted. Hence, nucleopore filters are particularly preferred since they provide porous membranes for the required specifications of the present invention. It should, however, be noted that nucleopore filters have a small film thickness and that therefore they are preferably used in combination with large-pore membranes (e.g., stainless steel membranes) that are superposed as a reinforcing layer.

(vi) Mechanically worked porous membrane

Other porous membranes that can preferably be used are organic high-molecular weight materials, metallic materials and ceramic materials that have holes and slits formed either mechanically or otherwise by means of drills, needles, blades and laser beams. Such porous membranes have the advantage that the position and size of holes can be accurately controlled.

When holes are to be made in membranes with needles, the thinner the membrane, the smaller the hole that can be made. This is because the needle tapers toward the tip. More preferably, a hole is made with the needle inserted from the side from which a solution is to be added, since this achieves a further decrease in the pore size at the outlet for the added solute solution. Needles that can be used include not only commercial products (e.g., sewing, medical, acupuncture and specialty needles) but also those needles which are produced by cold working, rolling, forging, grinding/polishing or otherwise working fine metal wires. Another preferred method comprises inserting a heated ($\geqq 100°$ CC.) needle and plasticing or burning the area where it is inserted. This is advantageous since the cut area is less damaged, producing strong holes.

As porous membranes in class (vi), organic high-molecular weight membranes, in particular organic high-molecular weight elastic membranes, are particularly preferred for the following reasons:

(1) pores can be readily made by inserting metallic needles, etc., into the membranes;

(2) because of their elasticity, when needles are slowly inserted and removed, the resulting pore size will be smaller than the diameter of the needle; with increasing rubber elasticity, the pore is closed when the needle has been removed and the apparent pore size is approximately zero micron; therefore, porous membranes having desired pore sizes can be obtained using membranes of varying moduli of elasticity; and (3) as increasing pressure is applied to the porous membrane, the pore size increases and becomes sufficiently large to permit an increased flow. When the applied pressure is reduced to zero, the pores are closed, thereby preventing the reaction solution from entering the solute solution being added. Therefore, by properly adjusting the application of pressure, the pores in the porous membrane can be closed or opened as required and, at the same time, the pore size can be controlled, allowing the control of flow quantity over a wide range with a single porous membrane.

The preferred ranges of the percent elongation at elastic limit of such elastic membranes are shown in Table 1 below.

The porous membranes that are preferably used in the present invention are those which have pore sizes, pore-to-pore distances, pore size distribution and pore lengths that are exactly in accordance with designed values. In this respect, multi-layered porous membranes consisting of a porous membrane made of bound fine particles having a particle size distribution (C.V.) which is preferably 40% or below, more preferably 20% or below, or a porous membrane made of woven fabric consisting of fibers having a square or rectangular cross section, or a microprocessed membrane of class (v), a uniformly hardened gelatin membrane, or a porous membrane of class (vi), that are combined with a large-pore membrane are more preferred.

C. Forms of porous membrane

The porous membranes are roughly classified as a flat type, a pleated type and a hollow tube type. Among those, membranes of a hollow tube type are used with particular preference since they have the following many advantages.

Figure 1A:
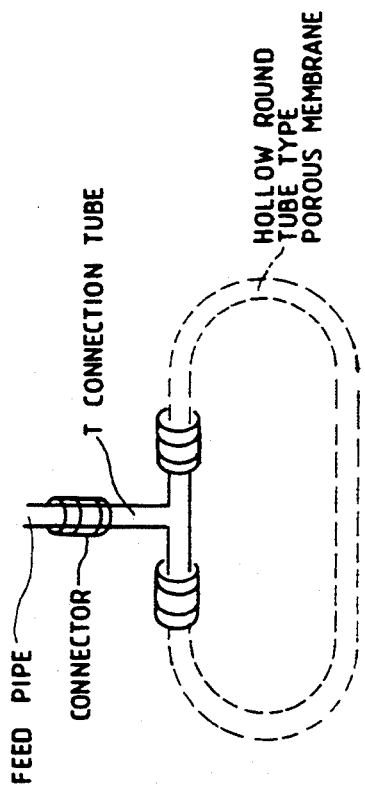
FIG. 1(a) shows connection to a circular hollow tube.
Figure 1B:
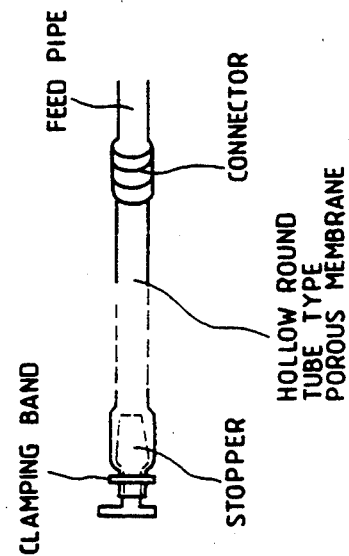
FIG. 1(b) shows connection to a straight hollow tube.

(i) A simple support will suffice. In the case of a porous membrane in the form of a hollow round tube, installation can be easily accomplished by merely coupling it to a supply pipe from the addition system by means of connectors. This is because the round tube itself has a pressure-resistant construction. Specific examples of coupling methods include T coupling (see FIG. 1(a)), direct coupling (see FIG. 1(b)) and combinations of these two methods. The terminal end of the hollow tube can be sealed either with a stopper as shown in FIG. 1(b) or with an adhesive.

(ii) The area of the membrane can be easily adjusted by merely changing the length of the hollow tube.

(iii) The value of SC can be increased by using a hollow tube that is sufficiently long to provide a network of the tubes within the reaction solution.

(iv) Good characteristics can be obtained under application of pressure. If an increasing pressure is applied to the hollow tube type membrane, its diameter will usually increase and hence the pore size will also increase. The amount of such increase will become greater if the hollow tube is made of an elastic material with a small modules of elasticity. Hence, the tube can be used over a broader range of flow quantities. The tube also has high pressure resistance.

There is no particular limitation on the cross-sectional shape of the hollow tube but round tubes are usually more advantageous since they can be easily connected to supply pipes.

If increasing pressure is applied to a flat membrane, it is strongly pressed against a support such as a stainless mesh screen and the membrane will densify to reduce the pore size. This is unfavorable for the purpose of increasing flow quantity.

(v) The specific surface area of the membrane can be increased. Compared to other types of membranes, the specific surface area (the ratio of surface area S to volume V) of a hollow tube type membrane can be increased. Hence, this type of membrane is not so bulky, which substantially reduces the effective capacity of the reaction vessel. When a hollow tube type membrane is used, the outside diameter of the tube is preferably 30 mm or below, more preferably 20–0.5 mm, most preferably 10–1 mm.

D. Operation of the Porous Membrane addition system

When solute solutions are to be added through a porous membrane in the addition system installed within the reaction solution, the following precautions should be exercised.

(a) Pressure applied to the addition system

If the porous membrane is made of a hydrophilic material (i.e., the angle of contact $<90°$ C.), when the membrane is placed within the vessel solution, the solution will be drawn into the pores in the membrane by capillary action. Suppose that $N_2$ gas at a pressure ($\Delta P$) is applied to the addition system to prevent the entrance of the vessel solution into pores in the membrane. If, in this case, $2\pi r \cdot \sigma_{vs} \cdot \cos\theta$ (the force with which the vessel solution will get into fine pores by capillary action) is smaller than $\Delta P \pi r^2$ (the force with which the vessel solution is pushed out of the pore by the pressure differential), the vessel solution will be pushed out of the porous membrane. In the relationship described above, $r$ is the radius of a fine pore, $\sigma_{vs}$ is the surface tension of the vessel solution, and $\theta$ is the angle of contact between the vessel solution and the porous membrane. However, if $\Delta P$ is excessive, $N_2$ gas will be released continuously from the pores, causing the vessel solution to foam. To avoid this, the quantity that $\Delta P \cdot dV$ (the work of constant-pressure expansion that is done by foam being extruded from the pores) must be smaller than $\sigma_{vs} \cdot dA$ (the work that is done to form a new surface against the surface tension). If the bubbles of foam are approximated by spheres, this relationship may be rewritten as $\Delta P \cdot r > 2\sigma_{vs}$. Hence, in the case of $\theta < 90°$ C., if $\Delta P$ is controlled in such a way as to satisfy the following condition:

$$\frac{2\sigma_{vs}\cos\theta}{r} < \Delta P < \frac{2\sigma_{vs}}{r} \tag{4}$$

neither forming nor intrusion of the vessel solution into the porous membrane will occur. The point where $\Delta P$ is equal to $2\sigma_{vs}/r$ is generally referred to as a "bubble point".

If the porous membrane is made of a hydrophobic material $\theta > 90°$ C.), water will not get into the membrane on account of capillary action even if $\Delta P < 0$. If, in this case, the quantity $-2\pi r \cdot \sigma_{vs} \cdot \text{vos}\,\theta$ (the force with which fine pores repel the vessel solution) is greater than $-\Delta P \pi r^2$ (the force that causes the vessel solution to get into the pores under negative pressure), the vessel solution will not be drawn into the pores. Hence, in the case under consideration, if $\Delta P$ is controlled in such a way as to satisfy the following condition:

$$\frac{2\sigma_{vs}\cos\theta'}{r} < \Delta P < \frac{2\sigma_{vs}}{r} \quad (5)$$

neither foaming nor intrusion of the vessel solution into the porous membrane will occur.

From the relationships discussed above, it can be concluded that: (1) the porous membrane is preferred if $\theta > 90°$ C. since the range of $\Delta P$ is sufficiently broad to facilitate the intended operation; and, that (2) even in the case of $\theta < 90°$ C., the porous membrane is preferably made of a material with large $\theta$ since the range of $\Delta P$ is sufficiently broad to facilitate the adjustment of gas pressure. For example, the angle of contact $\theta$ between Teflon and water is 180; so, it is particularly preferred.

If the vessel solution is an aqueous solution, the relationship between the bubble point pressure $\Delta P$ and the pore size ($\phi$) may be expressed as shown graphically by dashed line a in FIG. 2, wherein the surface tension of the aqueous solution is approximated by 70 dynes/cm. In the case of a gelatin-containing aqueous solution that is typically used in the present invention, the surface tension of that solution is smaller than that of water, so the bubble point $\Delta P$ will be somewhere between the values indicated by the dashed lines a and the long-and-short dashed line b in FIG. 2. When the addition of the solute solution of interest begins, a pressure greater than the bubble point pressure $\Delta P$ must be applied to allow the residual gas in the addition system to be released into the vessel solution through the porous membrane. However, the range of $\Delta P$ that can be used conveniently and precisely for the purposes of the present invention is generally not more than 50 kg/cm² preferably between 0.1–20 kg/cm², more preferably between 0.3–10 kg/cm². In this respect, it is preferable to use a porous membrane with a pore size such that the bubble point is present in the above-defined range of $\Delta P$.

In order to reduce the amount of foaming, one need only reduce the amount of residual gas present in the addition system. Hence, the "dead space" of the addition system may be reduced within the range where the above-described flow resistance is insignificant. When starting the addition of solute solution, the stopcock for the solute solution is opened and a pressure that satisfies the relationship $\Delta P > 2\sigma_{vs}r$ is continuously applied, whereupon all the gas present in the addition system will be released from the pores in the porous membrane.

(b) Installation of gas-release stopcock

Figure 3:
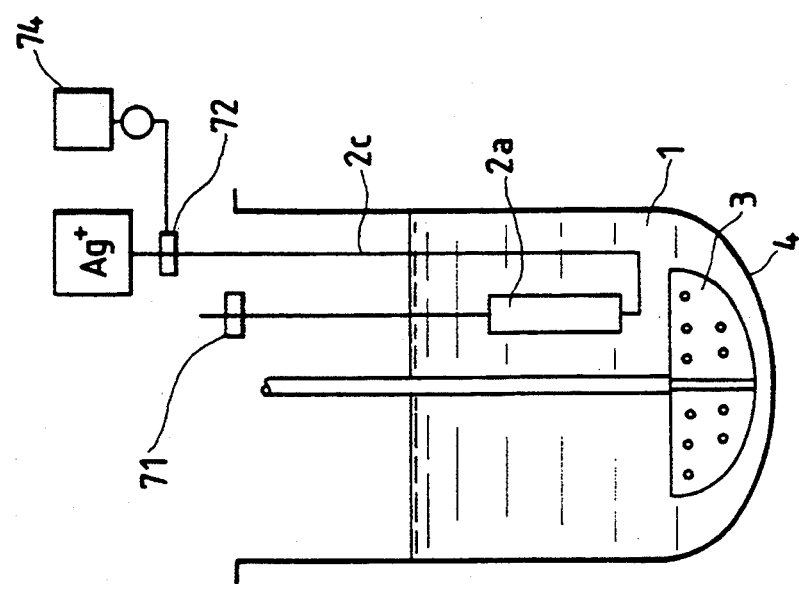
FIG. 3 shows a porous membrane addition system having a gas relief line.

The gas in the addition system can be easily drawn through a gas-relief line that is installed as shown in FIG. 3. If a stopcock 72 for the solute addition is opened while at the same time a gas-relief stopcock 71 is opened, the gas in the addition system will be released through the stopcock 71. When the gas has been completely drawn off, the gas-relief stopcock 71 may be closed. Obviously, no foaming will occur in the vessel solution if the above procedure is followed. It should, however, be noted that a small amount of gas that remains in the fine pores in the porous membrane is released into the vessel solution when the additional one solute solution of interest begins.

After completion of the addition of the solute solution, the stopcock 72 in FIG. 3 is switched to the gas line and the solute solution added is expelled at a pressure that satisfies the relationship $\Delta P < 2\sigma_{vs}/r$, so the residual solute solution will be released from the porous membrane but the gas will not. After all the residual solute solution has been expelled to empty the addition system, additional solute solutions can be added in any desired number of stages.

Referring to FIG. 3, the apparatus includes a vessel 4 having a vessel solution 1 therein and agitator blades 3 for agitation. The porous membrane system 2 has residual air left in the fine pores in the porous membrane when said system is supplied with the Ag+ containing solution, with the gas drawn off through the stopcock 71. In this case, the vessel solution is isolated from the solute solution by the air in the fine pores. In order for the gas in the fine pores to leave the porous membrane and enter the vessel solution, an applied pressure is necessary that satisfies the relationship $\Delta P > 2\sigma_{vs}r$, and in order for the gas in the fine pores to enter the solute solution, a negative (suction) pressure is necessary that satisfies the relationship $\Delta P > 2\sigma_{ss}/r$, where $\sigma_{ss}$ is the surface tension of the solute solution. Therefore, in the embodiment under discussion, $\Delta P$ is maintained at equilibrium in the range defined by:

$$-2\sigma_{ss}/r < \Delta P < 2\sigma_{vs}/r$$

and the vessel solution will not be miscible with the solute solution.

(c) The following methods may preferably be used to prevent the size of pores in the porous membrane from being restricted by the bubble point pressure $\Delta P$.

(1) In the region of small pore sizes, the solute solution or a solvent solution is preliminary charged into the porous membrane addition system prior to the addition of the solute solution. In this case, the porous membrane is within air, so if $\theta < 90°$ C., capillary action causes the solute solution to be drawn into the fine pores in the membrane at $\Delta P$, which is equal to $2\sigma_{ss}\cos\theta/r$, with $\theta$ being the angle of contact between the porous membrane and the solute solution. Even if no bubble point pressure is applied, the gas in the fine pores will be released by itself. In this case, the solute solution entering the fine pores should not leak out indefinitely into the surrounding air. In order to ensure that the solute solution will not be released through the fine pores, the quantity $\sigma_{ss}\cdot dA$ (the work done by the solute solution to form a new surface (dA) against the surface tension of that solution) is greater than $\Delta P \cdot dV$ (the work of constant-pressure expansion done when growing droplets are formed from the solute solution) must be established, assuming that a droplet of solute solution is approximated by a sphere. Stated more specifically, the solute solution will not leak out unless $\Delta P$ greater than the bubble point pressure is applied to the addition system, and the solute solution will not leave the fine pores unless a negative pressure greater than $-2\sigma_{ss}\cdot\cos\theta$ is drawn. Hence, the solute solution will remain stable within the fine pores in the range of $\Delta P$ that satisfies the following condition:

$$\frac{-2\sigma_{ss}\cos\theta}{r} < \Delta P < \frac{2\sigma_{ss}}{r} \quad (6)$$

In this state, the porous membrane is placed in the vessel solution immediately (0–30 seconds) before the addition of the solute solution; then the addition of the solute solution may begin. If $\theta > 90°$ C., the solute solution will get into the fine pores with a pressure being applied that satisfies the condition $\Delta P > 2\sigma_{ss} \cdot \cos \theta / r$. If $\Delta P > 2\sigma_{ss}/r$, the solute solution will not leak out of the fine pores. Hence, the solute solution will remain stable in the fine pores in the range of $\Delta P$ that satisfies the following condition:

$$(-2\sigma_{ss}\cos \theta)/r < \Delta P < 2\sigma_{ss}/r \qquad (7)$$

When the addition of the solute solution is completed, the porous membrane is lifted and brought into air, whereupon the initial state is restored. These procedures may be repeated as required. This approach has the advantage that after the addition of the solute solution is completed, the addition system can be cleaned as required by taking it out into the atmosphere air temperature.

(2) In another method, water is placed in the addition system when it is not used. For example, container 74 in FIG. 3 is filled with pressurized water and before the vessel solution is charged, stopcock 72 is switched in such a way as to supply water into the addition system. This process allows water to be fed into the addition system (in atmospheric air); and, as in method (1) described above, water enters the porous membrane. Stated more specifically, after gas is released through stopcock 71, $\Delta P$ is maintained within the range specified by the relationship (6) or (7), whereupon water gets into the porous membrane. Stopcock 72 is then closed and the vessel solution is charged. Thereafter, stopcock 72 is opened and a solution of $Ag^+$ is added. When a given amount of the $Ag^+$ solution has been added, stopcock 72 is switched to the water line and water is supplied into the addition system. Stopcock 72 is then closed and held in that condition until the next cycle of addition is started. These steps may be repeated as required.

(d) In one embodiment, the vessel solution may be permitted to enter the porous membrane. Consider, for example, the case where the porous membrane 2a in FIG. 3 is of a hollow tube type whose inside diameter is nearly equal to the inside diameter of the supply pipe 2c. If the main valve in the addition system is closed, the vessel solution getting into the porous member will cause the pressure within the addition system to elevate until it balances at a certain point; then, the vessel solution will no longer enter the porous membrane. When the addition of the solute solution is started, the vessel solution is first released from the addition system and then the gas in the supply pipe is released, followed by the release of the solute solution. Hence, the vessel solution being supplied will not mix directly with the solute solution. Porous members of class II can also be used in the manner described above.

(e) An elastic hollow tube type porous membrane may be used. If the membrane is such that the pore size is zero when $\Delta P$ is nearly equal to zero, the vessel solution can be prevented from entering the porous membrane when the solute solution is no longer added. See discussion under B.(vi).

(f) Methods of applying pressure to the porous membrane

The following methods can be used to apply pressure to the porous membrane addition system of the present invention: (1) a gas pressure is applied from a container of high-pressure gas through a pressure reducing valve; preferred gasses are those which cause minimum interaction with the solute solution and may be exemplified by inert gases (e.g., $N_2$ and Ar) and air; gas pressures of 0–150 atm. can usually be attained with commercial gas containers; (2) a high-pressure gas produced with a compressor is applied to the addition system; a piston pump, a rotary pump, a piston compressor, etc. are usually employed; and (3) a piston, etc. are used to apply pressure directly to the solution without a gas intermediary; in this method, a plunger pump or a diaphragm plunger pump is used to apply pressure.

Among the methods described above, the application of pressure with a plunger pump is particularly preferred because even if the pore size varies with temperature or $\Delta P$, the flow quantity is in no way influenced, but can instead be controlled exactly by the descending speed of the plunger. The descending speed of the plunger pump is preferably controlled by a digital system because this provides more precise control than an analog system.

For details about the methods of pressure application, reference may be had to the following: "Mako Riyo Gijutsu Handobukku (Handbook of Membrane Technology)", ed. by H. Oya, Section 2.6, Ko Shobo (1983); "Kagaku Sochi Hyakkajiten (Encyclopedia of Chemical Apparatus)", Chapters 1 and 22, Kagaku Kogyosha (1976); "Yuatsu Kogaku Handobukku (Handbook of Hydraulic Engineering)", ed. by Ishihara, Ichikawa, Kaneko and Takenaka, Asakura Shotten (1972); Japanese Patent Application Nos. 78534/1990, 43791/1990 and 22842/1988.

(g) Addition System for forming mixed-crystal AgX grains

In the system for producing AgX emulsion grains, the composition of mixed crystals is often varied as crystals grow. A specific example of the operation adopted in that case is described below.

Figure 4:
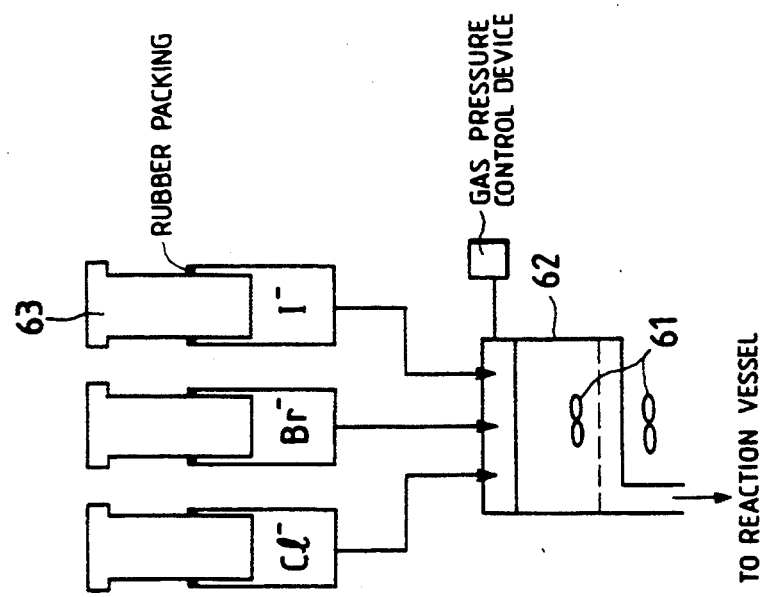
FIG. 4 shows a system for adding a $X^-$ salt solution to produce mixed-crystal AgX grains.

FIG. 4 shows a system in which solutions of $Cl^-$, $Br^-$ and $I^-$ salts are expelled with plungers 63 and mixed together in a mixing box 62, with the mixture being then added into the vessel solution through a porous membrane. The proportions at which $Cl^-$, $Br^-$ and $I^-$ are mixed are adjusted by the descending speeds of the respective plunger pumps. The pressure to be added to the porous membrane is controlled by a gas pressure regulator connected to the mixing box. The mixing with a magnetic stirrer 61 in the mixing box may be omitted and instead, turbulence may be created in the supply pipes or by embossing the walls of the pipes to form an uneven surface in the fluid path. For details of these methods, reference may be had to "Kagaku Sôchi Binran (Handbook of Chemical Apparatus)", ed. by The Society of Chemical Engineers, Japan, B-14, Maruzen, (1989). The capacity of the mixing box is no more than a fifth, preferably no more than a tenth, of the capacity of each plunger. Needless to say, the volume of solutions in the mixing tank is preferably as small as possible in order to cause more rapid change in the halide composition.

(h) Prefilter

If dust is present in the solute solution to be added, it can potentially clog the porous membrane. It is therefore preferred to remove any dust from the solute solution by a suitable method such as passage through a prefilter. The advantage of dust removal becomes more pronounced as the pore size decreases.

(i) The volume within the porous membrane of the addition system

The volume of the hollow portion in a porous member of the addition system is preferably small if it is desired to reduce the amount of foaming in an embodiment where the air in that space is released to the vessel solution when the solute solution is added. However, if that space is too small, the flow resistance in the hollow portion will cause a pressure loss. This pressure loss is not desirable since no effective pressure will be applied to the porous membrane. The proportion of the pressure loss is preferably no more than 50% of the applied pressure, more preferably 20% or less.

E. Apparatus for mixing under agitation (i) The basic process of mixing under agitation The solute solution added to the vessel solution by the methods described above is released in the form of fine streams. The size of a cross section of liquid mass in the streams is controlled by the size of pores in the porous membrane. Ideally, this size is very small and on the order of up to $10^2$ Å. The basic factors for achieving more uniform mixing of the solute solution are: (a) the natural diffusion of the solute; (b) the shear on the liquid mass due to the viscosity resistance of an obstacle such as a baffle plate in the fluid; (c) the shear on the liquid mass due to the inertial resistance of the obstacle; and (d) the uniform mixing of the vessel solution as a whole due to the overall circulating flow within the vessel. The basic processes of these factors (a)–(d) are described below.

(a) The diffusion coefficients (D) of $AgNO_3$ and NaBr in aqueous solution (25° CC.) are approximately $1.7 \times 10^{-5}$ cm$^2$/sec and $1.6 \times 10^{-5}$ cm$^2$/sec for $AgNO_3$ and NaBr, respectively. Since the mean diffusion length (L) within time t is given by $\sqrt{Dt}$, $L(AgNO_3) \cong 4.1 \times 10^5$ Å/sec = $4.1 \times 10^3$ Å/0.1 msec) $\cong L(NaBr)$. If a molecule is regarded as a rigid sphere, D is given by $T^{1.5}/P$ (T=absolute temperature and P=pressure), so under the usual conditions for the preparation of AgX emulsions (25°–80° C. ×1 atm.), $L(AgNO_3) \cong L(NaBr) \cong (4.1 \times 10^5$ Å/sec = $4.1 \times 10^3$ Å/0.1 msec). Hence, the effect of temperature may well be regarded as insignificant. The results of the calculations show that, since solute ions in the liquid mass of streams diffuse over a distance of ca. $4 \times 10^3$ Å within a time period of ca. $10^{-4}$ sec, uniform mixing by molecular diffusion is highly likely to occur within $10^{-4}$ sec after the addition of the solute solution if the diameter of that liquid mass is no more than ca. $10^4$ Å, preferably no more than $10^3$ Å.

Assume that the diameter of the liquid stream mass is nearly equal to the pore size, which is 2r, and also assume that the diffusion length (L) of solute ion $AgNO_3$ for a period within $10^{-4}$ sec is approximately equal to the diffusion length (L) of the other solute ion NaBr, which is approximately $4.1 \times 10^3$ Å. In a model where each of the solute ions in the liquid stream mass is assumed to undergo molecular diffusion to a cylindrical form having a radius of r+L within a period of $10^{-4}$ sec, the liquid mass is diluted by a factor of $\pi(r+L)^2/\pi r^2$. This may be expressed as graphically shown by solid line c in FIG. 2. For the case of diffusion within a period of $10^{-2}$ sec, the dilution is represented by solid line d in FIG. 2.

This also shows that in order to achieve uniform mixing, the gap between fine pores is preferably at least $10^4$ Å, more preferably at least $10^5$ Å, most preferably in the range of $10^6$–$10^8$ Å. If the solute solution is added in the form of small droplets, the surface to volume ratio of the liquid stream mass will increase; hence, the total surface area of the diffusion layer in which the solutes can diffuse will increase appreciably, whereby this diffusion term (a) will make greater contribution than terms (b) and (c). This is one of the principal differences between the method of the present invention and the conventional theory of agitation which deals with only terms (b) and (c). The conventional theory of agitation starts by assuming the existence of a macroscopic rapidly liquid mass and then discusses how to divide it into smaller masses.

Achieving uniform mixing with its first step performed by diffusion is also advantageous from the viewpoint of operational consistency. The process of mixing under agitation caused by turbulences can vary with such factors as the differences in apparatus and the vessel's capacity; but, the process of diffusion will always comply with the Einstein equation and is insensitive to the effect of apparatus constant. According to the law of Richardson, $L \propto t^3$ in the case of diffusion by turbulence and the effect of an increase in t is greater than in the case of molecular diffusion where $L \propto \sqrt{t}$. Thus, it may be said that term (a) is more influential where t is smaller whereas terms (b) and (c) are more significant where t is increased.

In the present invention, the porous membrane is usually a stationary element in the fluid, so it also serves as an obstacle. The liquid stream mass added is immediately subjected to shear forces due to terms (b) and (c) on the surface of the membrane, whereby it is finely divided and rapidly mixed uniformly with the vessel solution.

For details about terms (b), (c) and (d), as well as the installation of baffle plates and the methods of mixing under agitation, prevention of foaming and other methods of mixing under agitation, reference may be had to the following: Japanese Patent Application No. 78534/1990, "Kagaku Kogaku Binran (Handbook of Chemical Engineering)", ed. by the Society of Chemical Engineers, Japan, Chapter 20, Maruzen (1988); "Shoseki (Crystallization)", ed. by T. Misawa, Section 6.1, Kagaku Kogyosha (1983); "Shin Jikken Kagaku Koza (A New Course in Experimental Chemistry) 1, Kihon Sosa (Basic Operations) II", ed. by The Chemical Society of Japan, Section 5.2, Maruzen (1975); "Kongo Oyobi Kakuhan (Mixing and Agitation)", enlarged ed. by T. Misawa, Kagaku Kogyosha (1984); and the references listed below.

F. Specific example of the apparatus for producing AgX emulsions

A specific example of the apparatus for producing AgX emulsions is described below, with reference to the case where the porous member is installed within a reaction vessel. Needless to say, the present invention is by no means limited to the particular embodiment described below.

As mentioned above, the porous member is preferably installed within the reaction vessel so the pores are distributed as broadly as possible within the reaction vessel.

(i) FIG. 5 shows a preferred embodiment of the porous membrane addition system. The addition system for an aqueous silver salt solution 2a through a first hollow round tube type porous membrane and the addition system for an aqueous $X^-$ salt solution $2b$ through a second hollow round tube type porous membrane, and pores are distributed extensively throughout the bulk of the vessel solution. Since each of the hollow round type porous membranes has a large effective surface area, the apparatus shown in FIG. 5 is very close to the ideal system of the present invention already described above. For clarity, a plurality of membrane elements $2a$ and $2b$ cannot be represented, so only one each of them is shown in FIG. 5(a). Item 5 in FIG. 5(a) is either a porous membrane support or a porous membrane addition system. This is provided to achieve more uniform mixing. The baffle plates 6 in the peripheral portion of the system insure that the vessel solution 1 rising in the peripheral portion of vessel 4 will be efficiently returned to the central portion. Since these baffle plates are streamlined, minimum foaming occurs even at fast flow rates. The porous membranes consisting of round hollow circular tubes, acts not only to help the solute solution add uniformly to every part of the vessel solution, but also serves as a stationary element, creating a small turbulence in every part of the added solute solution. The added solute solution is rapidly mixed uniformly with the vessel solution by the turbulence created around the round tubes.

Agitating blades 3 in FIGS. 5(a) and 5(b) are installed at a point that is positioned close to the bottom of the reaction vessel, farthest away from the surface of the vessel solution. These agitating blades prevent foaming. Many holes are made in the agitating blades, to provide them with multiple surfaces; which create a velocity gradient in the reaction vessel.

The overall flow of the solution is such that the natural sequence of flows, consisting of rotary delivery in transverse direction by means of the agitating blades, smooth return of the solution from the baffle plates in the periphery of the vessel toward the central portion, and movement to the region of the agitating blades, is promoted efficiently to enhance the frequency of circulation. The baffle plates in the periphery of the vessel are pressed into the vessel wall during its fabrication.

The hollow tube type porous membrane preferably has a nearly circular cross section in order to insure high pressure resistance.

(ii) An exemplary installation of a porous member in class II can be accomplished by replacing $2a$ and $2b$ in FIG. 5 with a porous member of class II. In this case, the outlets for adding solute solutions are provided at the tip of $2a$ and $2b$. The distance between adjacent members $2a$ may be the same or different from the distance between adjacent members $2b$. Each of the members $2a$ and $2b$ may be an assembly of fine tubes; this is a preferred embodiment since the value of SC in eq. (1) can be increased.

Figure 7:
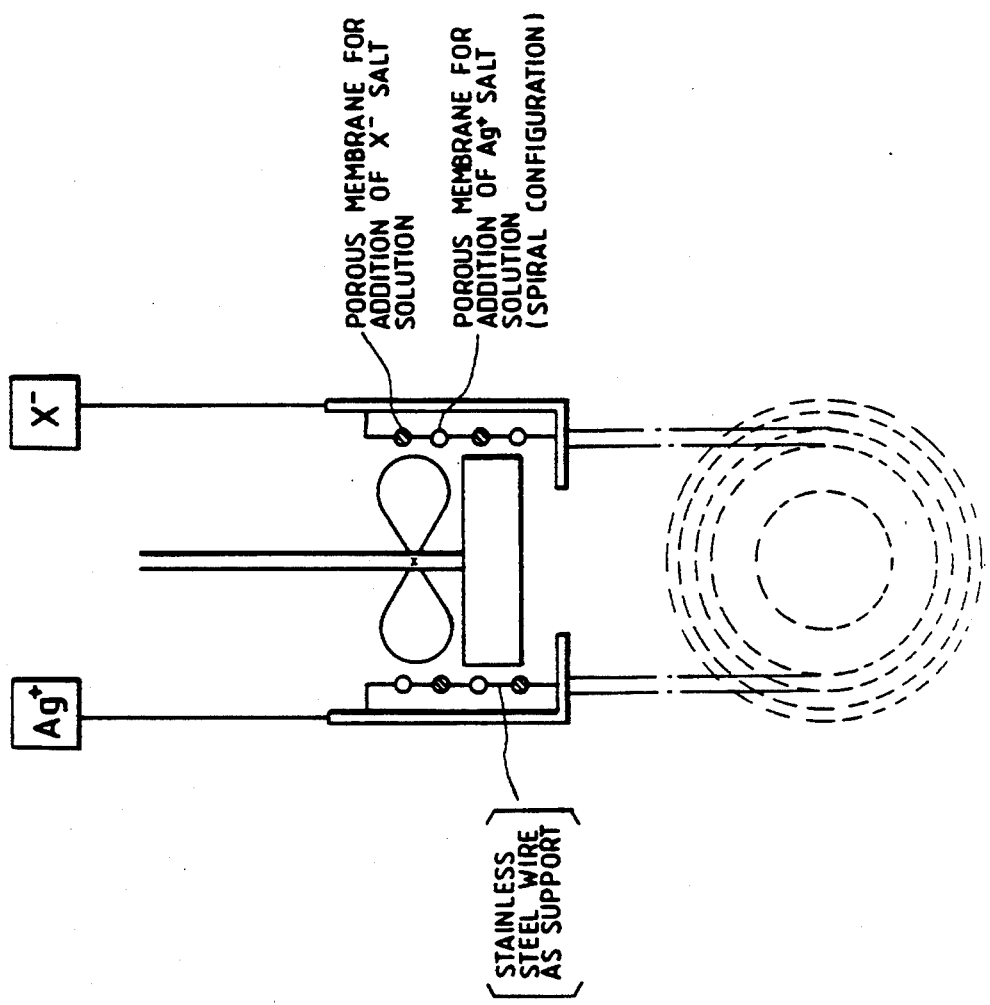
FIG. 7 shows an embodiment in which a spiral hollow tube type porous membrane is provided in the mixing box.

(iii) Other possible embodiments are modifications of the apparatus for producing AgX emulsions that is described in JP-B-55-10545, which include: an embodiment in which a solution of $Ag^+$ salt and a solution of $X^-$ salt are added to the mixing box through a hollow cylindrical tube type porous membrane at the bottom of said box (see FIG. 6 of the present application); an embodiment in which the two solutions are added through a hollow cylindrical tube type porous membrane within the mixing box (see FIG. 7); and embodiment in which a flat porous membrane is provided on the inside surface of the mixing box; and an embodiment in which two or more of the embodiments described above are combined. Another embodiment that can be adopted is the use of two or more mixing boxes.

Figure 8:
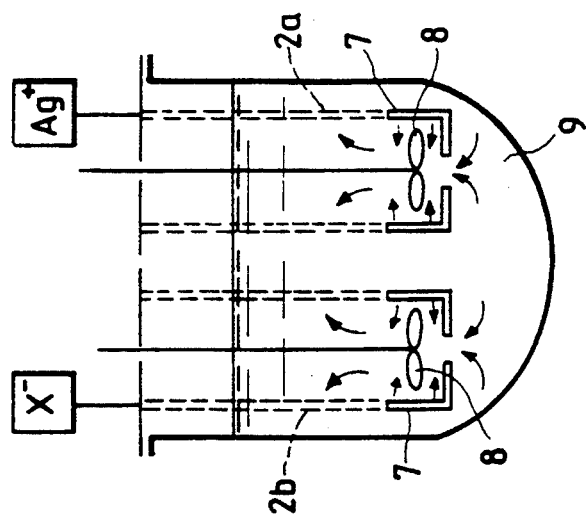
FIG. 8 shows an embodiment in which $Ag^+$ and $X^-$ salt solutions are mixed in separate mixing boxes and are thereafter released into a bulk solution.

(iv) FIG. 8 shows an embodiment in which the addition system for a silver salt solution uses a separate mixing box from the addition system for an $X^-$ salt solution. The respective mixing boxes in this case may adopt any of the embodiments described in (iii). The silver salt and the $X^-$ salt that have been added uniformly through porous membranes are mixed uniformly within the associated mixing boxes 7 by means of agitators 8 and are thereafter mixed under agitation within a bulk solution 9.

Further, there is conceived an embodiment in which the $Ag^+$ salt solution is added into the mixing box as in the embodiment described in (iii) and the $X^-$ salt solution is added into the bulk solution 9 as in the embodiment described in (i), or an embodiment in which the $Ag^+$ salt solution and the $X^-$ salt solution are added in the reverse way to the former embodiment. In accordance with an object, either of the embodiments may be selected.

Figure 9:
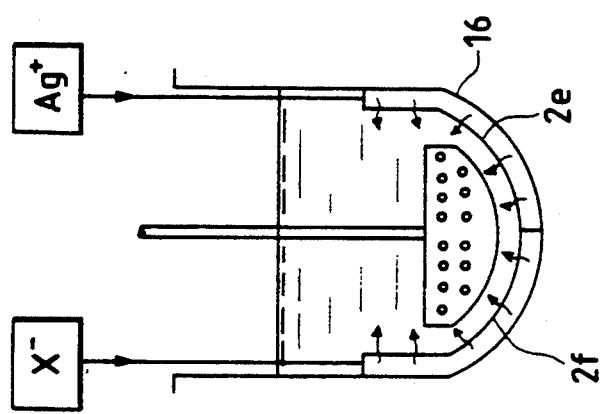
FIG. 9 shows an embodiment in which a porous membrane is attached to the inside surface of a reaction vessel.

(v) FIG. 9 shows another embodiment of the present invention, in which porous membranes $2e$ and $2f$ are attached to the inside surface of a reaction vessel 16 and solute solutions are added along the inside surface of the vessel. Another embodiment that can be used is a modification of the system shown in FIG. 5, in which porous membranes $2e$ and $2f$ are provided on the baffle plates 6 and solute solutions are added along those baffle plates.

Figure 10:
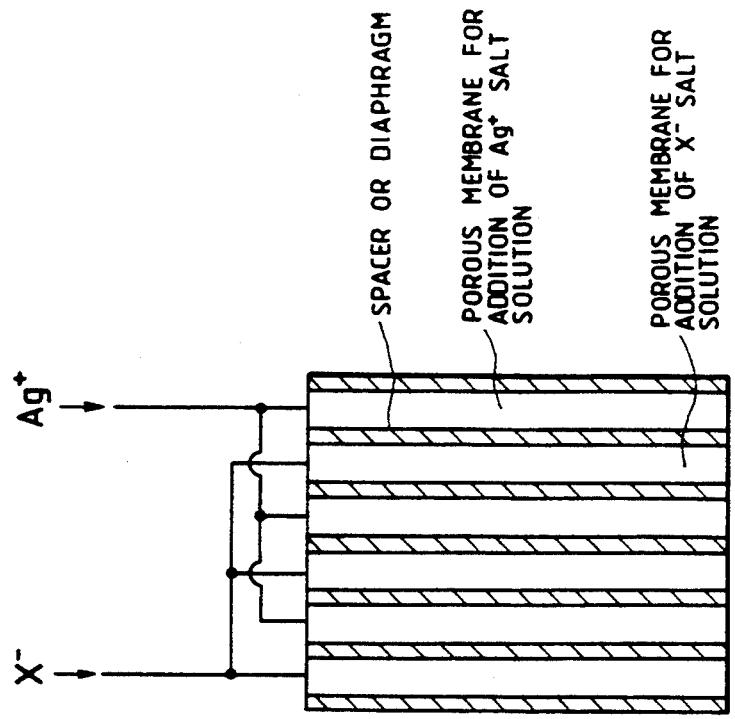
FIG. 10 shows an embodiment in which porous membranes for addition of $Ag^+$ and $X^-$ salt solutions are arranged in a stripe pattern.

(vi) Microscopic mixing of $Ag^+$ and $X^-$ salt solutions FIG. 10 shows an apparatus in which outlets for adding $Ag^+$ and $X^-$ salt solutions are arranged in a stripe pattern. Various embodiments of this case are conceivable: an embodiment in which thin hollow fiber type porous membranes are spaced on a flat plate parallel to one another and fixed with an adhesive; an embodiment in which fine hollow tubes are arranged on a flat plate parallel to one another and fixed with an adhesive, with only the front side of the assembly of hollow tubes being rendered porous by the microprocessing techniques already described herein above; an embodiment in which hollow fiber type porous membranes are spaced and fixed with yarns to form a roll screen; and an embodiment in which such roll screens are constructed three-dimensionally. According to any of these embodiments, the $Ag^+$ and $X^-$ salt solutions are mixed together in a finely divided state and are thereafter released into the bulk solution.

Figures 11A, 11B, 11C, 11D:
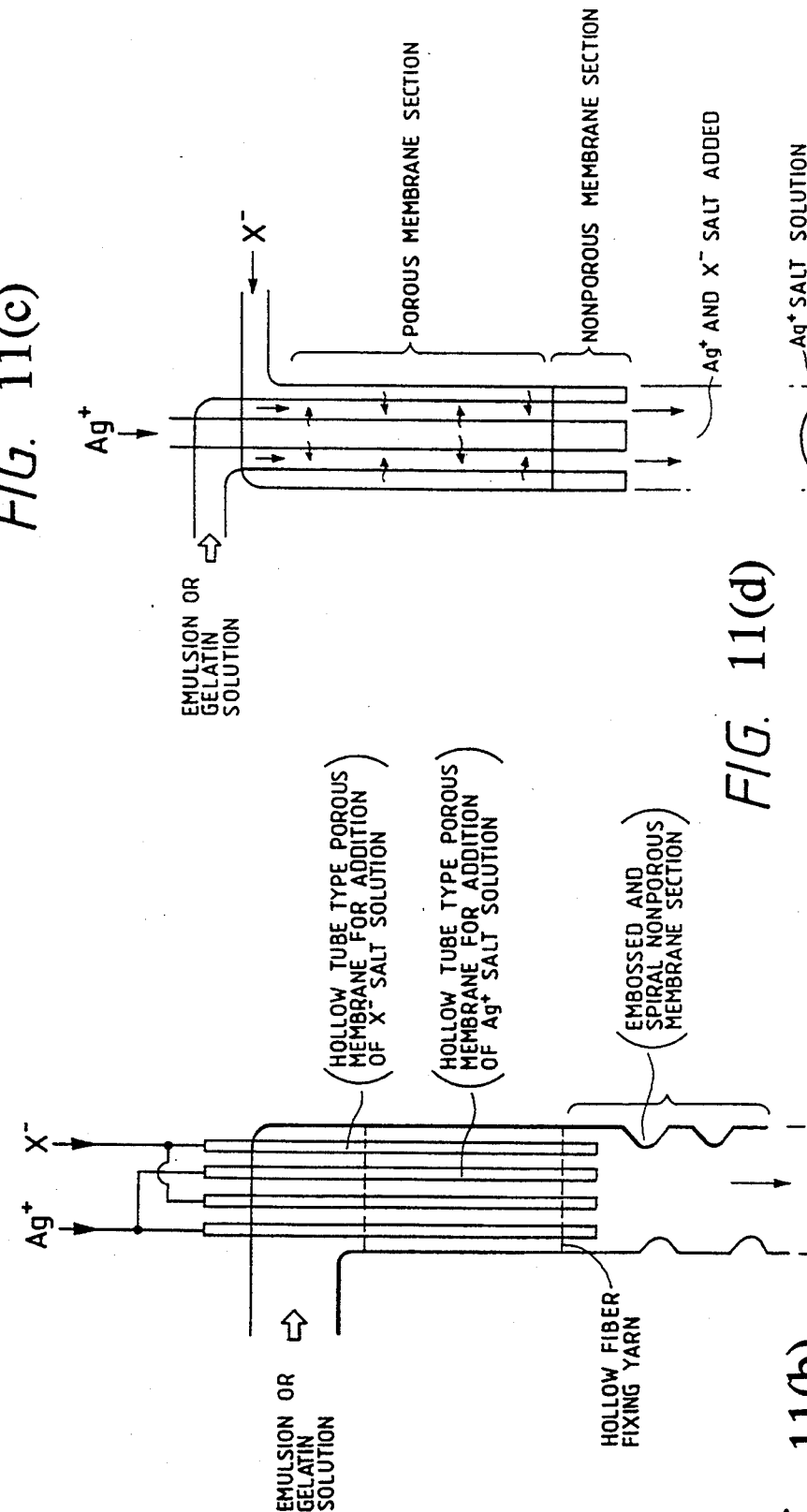
FIG. 11 shows embodiments in which $Ag^+$ and $X^-$ salt solutions are uniformly mixed by passage through respective porous membranes and are thereafter added to a vessel solution.

In another embodiment, $Ag^+$ and $X^-$ salt solutions are respectively passed through porous membranes and mixed uniformly to form unstable AgX nuclei, with the mixture then being added to the vessel solution. Two examples of this embodiment are shown in FIG. 11. In FIG. 11(a), an assembly of hollow fibers for addition of $Ag^+$ and another assembly of hollow fibers for addition of $X^-$ are placed within an outer tube, and $Ag^+$ and $X^-$ salt solutions are added through the hollow fiber type porous membranes into an emulsion or gelatin solution supplied by means of a pump. In FIG. 11(b), a three-walled tube is used, and an $Ag^+$ salt solution and an $X^-$ salt solution, which are added through the inner and outer tubes, respectively, pass through a porous membrane for introduction into an emulsion or gelation solution flowing from the intermediate tube.

In these embodiments shown in FIG. 11, the length of the non-porous membrane section can be properly selected to adjust the size of unstable AgX grains. Preferably, gelatin (see below under section G) is incorporated in at least one of the $Ag^+$ and $X^-$ salt solutions.

In addition to the batch reactors and semi-batch reactors described above, continuous reactors (tube and tank types) and other reactors can be used; and, the porous member addition system of the present invention described above can be applied to all types of reaction vessels. For details of the reactors that can be used, reference may be had to "Kagaku Kogaku Binran (Handbook of Chemical Engineering), III Hanno Sosa Hen (Reaction Operations)", ed. by the Society of Chemical Engineers, Japan, Maruzen (1988). The addition system of the present invention can also preferably be applied to the apparatus described in Japanese Patent Applications Nos. 188243/1990, 258862/1989, 43791/1990 and 142635/1990.

G. Dispersion media

Dispersion media that are commonly employed in AgX emulsions can be used to produce AgX emulsions according to the practice of the present invention. Not only gelatin, but also various other hydrophilic colloids can be used. Gelatin is usually preferred. Examples of gelatin that can be used include alkali-processed gelatin, acid-processed gelatin, derivative gelatins such as phthalated gelatin, and low-molecular weight gelatins (mol. wt. 2,000–100,000; enzyme-decomposed gelatin and acid or alkali hydrolyzed gelatin, and termally-decomposed gelatine), gelatine whose methionine content is low or whose methionine is inactivated as well as mixtures thereof. Derived gelatins are produced by reacting gelatin with various compounds including acid halides, acid anhydrides, isocyanates, bromacetic acid, alkanesultones, vinylsulfonamides, maleinimide compounds, polyalkylene oxides, epoxy compounds, etc. Other dispersion media that can be used include: graft polymers of gelatin and other high-molecular weight materials; proteins such as albumin and casein; cellulosic derivatives such as hydroxyethyl cellulose, carboxymethyl cellulose and cellulose sulfate esters; sugar derivatives such as sodium alginate and starch derivatives; and many other synthetic hydrophilic high-molecular weight materials such as homopolymers exemplified by dextran, polyvinyl alcohol, partially acetalized polyvinyl alcohol, poly-N-vinyl pyrrolidone, polyacrylic acid, polymethacrylic acid, polyacrylamide, polyvinyl imidazole and polyvinyl pyrazole, or copolymers thereof. These dispersion media may be used either singly or in combination.

The concentration of dispersion media in the vessel solution is usually in the range of 1–10 wt. % during nucleation and crystal growth. In the case of forming nuclei for the completely entwined grains described in Japanese Patent Application No. 223739/1988, the concentration of dispersion media is preferably in the range of 1–15 wt. %, more preferably 3–15 wt. %. In the case of forming nuclei for the parallel double twinned grains described in Japanese Patent Application Nos. 319740/1987, 299155/1986 and 203635/1987, the concentration of dispersion media is preferably in the range of 0.05–5 wt. %, more preferably in the range of 0.1–1.6 wt. %.

Dispersion media can also be incorporated in the silver salt or $X^-$ salt solution to be added. In such a case, the concentration of dispersion media is preferably adjusted to be the same as the concentration of those solute solutions. Non-uniformity can also thereby be eliminated from the concentration of dispersion media at the outlet for the added solute solutions, so more uniform nucleation and growth of AgX grains can be insured.

The concentration of dispersion media to be incorporated in the solute solutions is preferably within the range of 0–5 wt. %. Low molecular weight gelatins (mol. wt. 3,000–40,000) will not gel even if they are present at high concentrations and hence are particularly preferred for use in the range of high concentrations (1.6–5 wt. %). When gelatin is added to the silver salt solution, the pH of the solution will increase to cause occasional formatting of silver hydroxide. To make the solution clear, its pH may be reduced to 5 or below by addition of a suitable compound such as $HNO_3$.

H. Other conditions

There is no particular limitations on the concentrations of solute solutions to be added and depending on the specific application they may vary from dilute concentrations ($10^{-3}$ mol/l) up to higher concentrations equal to the solubility limits of the reactants. If solute solutions are added in accordance with the teachings of the present invention, solutes can be added with extremely high uniformity, so even highly concentrated solutions can be added without causing trouble, such as the aggregation of emulsions. In producing emulsions using reactors of the same capacity, and increased yield of AgX emulsion grains per unit capacity leads to a lower production cost and hence is preferred. The yield will increase with the increase in the concentrations of reactant solutions. The concentration of solute solutions added may preferably range from 20 to 100 w %, more preferably from 40 to 97 wt. %, most preferably from 60 to 97 wt. %, of the solubility limits of the respective reactants at room temperature.

The apparatus of the present invention can be preferably used for a metod of manufacturing an AgX emulsion in which a previously prepared AgX micrograin emulsion is added ito a reactive solution, and a seed crystal in the reactive solution is grown. In this case, since the micrograins of the emulsion are added through the micro pore, it is necessary to satisfy the inequality: the pore size > AgX micrograin size. The micrograins are AgCl, AgBr, AgI and a mixed crystal of two or more of the materials, and the average grain size thereof is preferably less than 0.15 $\mu$m, more preferably less than 0.1 $\mu$m, and still more preferably less tha 0.06 $\mu$m. Te method may be seen in Jaspanese patent application laid-open Nos. 183417/1989 and 183645/1989 and Japanese patent application No. 142635/1990.

If the degree of supersaturation of solutes in the vessel solution is increased and AgX grains are grown by a mechanism in which diffusion-controlled growth is predominant, emulsion grains in either normal or tabular crystal form having a narrow grain size distribution can be obtained. The degree of supersaturation is preferably in the range of 20–100%, more preferably 40–97%, most preferably 60–97 wt. %, of the critical degree of supersaturation. In such a case, $Ag^+$ and $X^-$ and AgX fine grains are added at increasing rates as crystals grow, and various methods can be used to increase the speed of addition of those salts. In one method, the addition rates of (flow rates) of aqueous $Ag^+$ and $X^-$ salt solutions are increased with their concentrations held constant, as described in JP-B-48-36890 and 52-16364; in another method, the concentrations of the two solutions are increased. If desired, these two methods may be used in combination. The addition rates of $Ag^+$ and $X^-$ and AgX fine grains may be increased either stepwise or continuously, with the latter case usually being preferred. For details of the methods of increasing the addition rates, reference may Japanese Patent Application No. 223739/1988, JP-A-55-142329 and JP-A-58-113926 (the term "JP-A" as used herein means an "unexamined published Japanese patent application"), Japanese patent application No. 43791/1990, U.S. Pat. Nos. 3,650,757 and 4,242,445, as well as U.K. Patent No. 1,335,925.

The solute solutions may be added according to the previously calculated theoretical formulas described in Japanese Patent Application No. 223739/1988. The method of adding solutes according to the teachings of the present invention may be combined with conventional methods to the extent that they are not detrimental to the purposes of the present invention. The proportions of solutes to be added by conventional techniques are no more than 60 mol %, preferably no more than 40 mol %. It should be particularly noted that no more than 40% of solutes, preferably no more than 20% of solutes, are added in the stage of nucleation and the terminal stage of crystal growth (i.e., the region where solutes are added in amounts that do not exceed the last 0.2 mol % of all the solutes to be added).

The pH of the reactive solution is 1-13, and the pAg thereof is 1-12. In accordance with the object, most preferable combiation thereof may be selected. Normally, since fog tends to occur as the value of the pAg is lowered, it is preferable to lower the pH.

The apparatus for producing AgX grains that is described above can advantageously be used in every known method of forming AgX grains. For general information of known AgX grains, reference may be had to the documents listed below, as well as Japanese Patent Application Nos. 223739/1988, 31974C/1987 and 251377/1987.

2. Chemical Sensitization

The apparatus of the present invention for adding chemical reactants can also be used with advantage as an apparatus for chemical sensitization of AgX emulsion grains. In this case, the apparatus described above under section 1 can be used. When a solution of chemical sensitizer is added through a porous member placed in an AgX emulsion, the chemical sensitizer is uniformly mixed with the AgX emulsion, so all AgX emulsion grains are subjected to uniform chemical sensitization. Thus, all the AgX grains are optimally chemically sensitized (neither over- nor under-sensitized), producing contrasty, high-speed AgX emulsions. In such a case, the solution of chemical sensitizer is usually added to an AgX emulsion that is heated at 35°-80° C. under agitation.

The chemical sensitization nuclei that are formed by the chemical sensitizing reaction under consideration are composed of sulfur, selenium, tellurium, gold and Group VIII noble metal compounds, as well as phosphorus compounds, which may be used singly or in combination. Gold-sulfur sensitization nuclei are preferred; and, for details, reference may be had to the documents listed below. Specific examples of the compounds that can be used as chemical sensitizers include:

sulfur sensitizers such as sodium thiosulfate, thiourea compounds (e.g., triethyl thiourea and allyl thiourea), rhodamine compounds (e.g., 5-benzylidene-3-ethyl-rhodamine), thione compounds (e.g., 3-allyl-4-oxa-oxazolidine-2-thione), $Na_2S$, thioamide, polysulfa compounds, selenium compounds, and Te compounds; gold sensitizers include $HAuCl_4$, $KAu(SCN)_2$, $Na_3Au(S_2O_3)_2$ and $Au_2S$ colloids; and Group VIII noble metal compounds such as

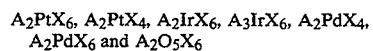

where A is K or $NH_4$, and X is Cl or Br.

For details of these compounds and other compounds that can be used as chemical sensitizers, reference may be had to the documents listed below.

3. Addition of photographically useful addenda

The method of the present invention for adding reactants can also be used with advantage for adding other photographically useful addenda to AgX emulsions. At least one of the following compounds may be added by this method: spectral sensitizing dyes, antifoggants (called "emulsion stabilizers" if used for the purpose of preventing the occurrence of fog during the storage of AgX light-sensitive materials, and so called "development restrainers" if used for the purpose of preventing the occurrence of fog during development), foggants (organic foggants such as hydrazine compounds, and inorganic foggants), supersensitizers, reduction sensitizers, latent image stabilizers, agents to prevent desensitization due to pressure, developing agents, and agents to improve photographic characteristics. The method of the present invention will prove particularly effective in the case where addenda cause irreversible reactions and, hence, in the fogging reaction caused by foggants and in the reduction sensitizing reaction caused by reduction sensitizers. For specific examples of the compounds that can be used as the above-described photographically useful addenda, reference may be had to the documents listed below.

4. Others

In producing AgX emulsions with the apparatus of the present invention, any additives can be added at any of the stages of grain formation up to coating operations. The present invention may be practiced in combination with every known technique. For details of this aspect, reference may be had to the following: JP-A-Hei-1-131541; Research Disclosure, Vol. 176 (item 17643), December 1978; ibid., Vol. 184 (item 18431), August 1979; ibid., Vol. 216 (item 21728), May 1982; ibid., Vol. 307 (item 307105), November 1989; Nikkakyo, monthly report, December, pp. 18–27, 1984; Nihon Shashin Gakkaishi (Journal of The Society of Photographic Science and Technology of Japan), 49, 7–12 (1986); ibid., 52,144–156 (1989); JP-A-58-113926, 58-113927, 58-113928, 59-90841, 59-142539, 62-253159, 62-99751, 63-151618, 62-6251, 62-11503, 63-305343, 63-220238, 62-27731, 62-269958, 61-112142, 62-266538, 63-220238, 63-78465, JP-A-Hei-1-131541, Hei-1-297649, Hei-2-146033, 2-838; Japanese Patent Application Nos. 208241/1987, 311518/1988; JP-B-59-43727; U.S. Pat. Nos. 4,707,436, 4,942,120; The Theory of the Photographic Process, Fourth Edition, ed. by T. H. James, Macmillan Publishing Co., Inc., New York (1977); Making and Coating Photographic Emulsions, V. L. Zelikman et al., Focal Press. 1964; Chimie et Physiques Photographique, P. Glafkides, Fifth Edition, Edition de l'Usine Nouvelle, Paris (1987); ibid.., Second Edition, Paul Montel, Paris (1957), K. R. Hollister, Journal of Imaging Science, 31,148–156 (1987), J. E. Maskasky, ibid., 30, 247–254 (1986); ibid. 32, 160–177(1988); and Die Grundlagen Der Photographischen Prozesse Mit Silverhalogeniden, ed. by Friesser et al., Akademische Verlaggesellschaft, Frankfurt (1968).

Silver halide emulsions produced using the apparatus of the present invention can be used in various types of photographic and recording materials including: black-and-white silver halide photographic materials (e.g., X-ray sensitive materials, printing light-sensitive materials, photographic papers, negative films, microfilms, direct positive sensitive materials, super fine-grain, dry-plate sensitive materials for use as photomasks in LSI, shadow masks and liquid-crystal display masks), color photographic materials (e.g., negative films, photographic papers, reversal films, direct positive color light-sensitive materials and silver dye bleach process photographic materials), diffusion transfer light-sensitive materials (e.g., color diffusion transfer elements and silver salt diffusion transfer elements), heat-processable light-sensitive materials (for black-and-white or color photography), high-density digital recording photosensitive materials, and holographic light-sensitive materials.

The emulsions produced using the apparatus of the present invention can advantageously be used as constituent emulsions as in Example 1 described in JP-A-62-269958, in JP-A-63-305343, in Examples 13 and 14 of JP-63-151618, as well as in the examples described in JP-A-60-95533, JP-A-59-142539, JP-A-62-253159, in Example 9 of Japanese Patent Application No. 203635/1987, and in the examples described in Japanese Patent Application Nos. 109773/1986, 54640/1987, 208241/1987 and 263319/1987.

Prior art cases of using porous membranes in systems of production AgX emulsions are described in JP-B-62-27008 and JP-A-62-113137. However, the apparatus described in those patents differ from those of the present invention; the prior art apparatus are intended either to prevent the increase in the amount of the vessel solution by filtering off water from the AgX emulsion being produced, or to remove soluble salts from the vessel solution.

Four typical embodiments of the present invention are summarized in Table 1.

TABLE 1

| | Broadest Embodiment | Preferred Embodiment | More Preferred Embodiment | Most Preferred Embodiment |
|---|---|---|---|---|
| Number of pores in porous member per system of addition | $\geq 4$ | $\geq 10$ | $30-10^{15}$ | $100-10^{10}$ |
| Pore Size | $\leq 5\ \text{mm}^\phi$ | $\leq 2\ \text{mm}^\phi$ | $10-5 \times 10^6$ Å | $10^2-10^6$ Å |
| Pore Size distribution (C.V. %) | — | $\leq 60$ | $\leq 30$ | $20\leq$ |
| SC value (degree of scattering) % | — | $\geq 0.1$ | $\geq 1$ | $\geq 10$ |
| Thickness of porous membrane ($\mu$m) | — | $\geq 20$ | $50-2 \times 10^4$ | $10^2-5 \times 10^3$ |
| $\Delta$P Value (kg) | — | $\leq 50$ | $0.1-20$ | $0.3-10$ |
| Flow quantity of solute solution (ml/min) | | $\geq 0.1$ | $0.3-200$ | $1-100$ |
| Constituent material of porous member | metals, ceramics, organic polymers | corrosion-resistant metals, ceramics, organic polymers | corrosion-resistant organic polymers | flourine resins, flourine rubbers |
| Capacity of reaction vessel (L) | $\geq 50$ | $\geq 100$ | $300-7000$ | $500-5000$ |
| Elongation (%) at elastic limit of porous membrane | $\geq 0$ | $\geq 5$ | $20-1000$ | $80-800$ |
| Form of porous membrane | flat, hollow tube, pleated | flat, hollow tube | hollow tube | — |
| Pore-to-Pore distance (Å) | — | $\geq 10^4$ | $\geq 10^5$ | $10^6-10^8$ |
| Concentration of solute solution (relative to concentration at solubility limit) | $\geq 10^{-3}$ mol/l | $20-100$ | $40-97$ | $60-97$ |
| Outside diameter (mm) of hollow tube type porous membrane | | $\leq 30$ | $20-0.5$ | $10-1$ |
| (degree of super-saturation during AgX crystal growth/critical degree of super-saturation) $\times$ 100 (%) | | $20-100$ | $40-97$ | $70-97$ |

EXAMPLES

The present invention is described below with reference examples where it is applied to the production of photographic emulsions. It should, however, be noted that the present invention is applicable to various other fields as set forth above.

Tabular grains were prepared using a reactor (vessel capacity: 4 l) of the construction shown in FIG. 6. Fluorine rubber tubes, each having an inside diameter of 1 mm and an outside diameter of 2 mm, were used as porous membranes in the reactor. Needles each having a diameter of 0.1 mm at the tip were slowly inserted through the tube wall to make 300 holes per addition system. The distance between adjacent holes was about 1 mm. When $\Delta$P was nearly equal to 0 kg/cm$^2$, the pore diameter was also nearly equal to zero millimeters. Solute solutions were added using a plunger pump apparatus (which could be constructed with reference to the apparatus described in JP-A-62-182623 and Japanese Patent Application No. 22842/1988, as well as to the plunger pump shown in FIG. 4).

The reaction vessel was charged with an aqueous solution of gelatin (1146 ml H$_2$O; 8.4 g of gelatin with an average mol. wt. $\overline{M}$ of $2 \times 10^4$; 5.4 g Kbr; pH 6.0) and with the solution being held at 30° C., an aqueous solution of AgNO$_3$ (containing 20 g of AgNO$_3$, 0.7 g of gelatin with $\overline{M}$ of $2 \times 10^4$ and 3.3 ml of 0.5N HNO$_3$ in 100 ml) and an aqueous solution of KBr (containing 14.9 g of KBr and 0.7 g of gelatin with $\overline{M}$ of $2 \times 10^4$ in 100 ml) were added simultaneously by a double-jet method at a rate of 98 ml/min over a period of 33 seconds. One minute later, an aqueous solution of gelatin (162 ml H$_2$O; 38 g of deionized and alkali-processed gelatin; pH 6.3) was added and after agitation for 2 minutes, the mixture was heated to 75° C. Following ripening at 75° C. for 18 minutes, 28.3 ml of an aqueous solution of AgNO$_3$ (18 wt. % sol.) was added at a rate of 7 ml/min. Three minutes later, 9.5 ml of an aqueous solution of NH$_4$NO$_3$ (50 wt. % sol.) were added and ripening was conducted for 18 minutes. Then, an aqueous solution of 3N $HNO_3$ was added to adjust the pH to 5.0. Subsequently, KBr was added and the silver potential was set at −20 mV (relative to a saturated calomel electrode SCE); then, an aqueous solution of $AgNO_3$ (18 wt. % sol.) and an aqueous solution of KBr (13.2 wt. % sol.) were added by a controlled (−40 Mv) double-jet method. The $AgNO_3$ solution was added over a period of 20 minutes by a linear flow acceleration method, with the start flow rate being increased to the end value of 35 ml/min. Following agitation for 2 minutes, the temperature of the reaction system was lowered to 30° C. and re-dispersion was conducted at 40° C. following washing with water. A replica image of the AgX grains produced was examined under an electron microscope. Various characteristics of those grains are summarized in Table 2 below.

EXAMPLES

The apparatus used in Example 1 was expanded to a capacity of 500 l with the relative dimensional proportions remaining unchanged. At the same time, the volume of the formula used in Example 1 was increased by a factor of 125. A tabular AgX emulsion was prepared by procedures that otherwise identical to those employed in Example 1. Various characteristics of the AgX grains obtained are summarized in Table 2. The number of holes in the porous membrane used in this example was 37,500.

Comparative Example 1

Tabular grains were prepared to the same formula as used in Example 1, employing the same apparatus (vessel capacity, 4 l) as described in JP-B-55-10545. Various characteristics of the AgX grains obtained are summarized in Table 2.

Comparative Example 2

The apparatus used in Comparative Example 1 was expanded to a capacity of 500 l with the relative dimensional proportions remaining unchanged. At the same time, the volume of the formula used in Example 1 was increased by a factor of 125. A tabular AgX emulsion was prepared by procedures that were otherwise identical to those employed in Example 1. Various characteristics of the AgX grains obtained are summarized in Table 2.

TABLE 2

| | Example 1 | Example 2 | Comparative Example 1 | Comparative Example 1 |
|---|---|---|---|---|
| Percentage of the number of hexagonal tabular size | 99.9 | 99.7 | 99.5 | 80 |
| Average size (μm) of hexagonal tabular size | 1.08 | 1.0 | 1.02 | 0.82 |
| Average aspect ratio of hexagonal tabular grains | 7.7 | 7.2 | 7.2 | 5.5 |
| Coefficient of variation (%) of hexagonal tabular grains | 11.0 | 12.0 | 13.0 | 20 |

The above data shows that the results of small-scale production in Example 1 were in good agreement with those of large-scale production in Example 2 because the apparatus of the present invention was employed in both of these examples. On the other hand, the results of small-scale production in Comparative Example 1 were not in good agreement with those of large-scale production in Comparative Example 2. In addition, new nuclei developed during the crystal growth in both comparative examples.

EXAMPLE 3

A reactor of the same type as used in Example 1 was charged with an aqueous solution of gelatin (1200 ml $H_2O$; 48 g gelatin; 0.36 g KBr; pH 6.0) and the temperature was elevated to 75° C. With agitation, an aqueous solution of $AgNO_3$ and an aqueous solution of KBr were added simultaneously at a rate of 4 ml/min (equivalent to 0.0672 g/min of $AgNO_3$) for a period of 10 minutes using a precision constant flow pump. Subsequently, the same solutions were added simultaneously at a rate of 26 ml/min for a period of 7 minutes. During these additions, the pH and pBr were held constant. Thereafter, an aqueous solution of KBr (27.5 wt. % sol.) was added and the silver potential (relative to SCE) was set at −25 mV. Subsequently, the same KBr aqueous solution and an aqueous solution of $AgNO_3$ (33.6 wt. % sol.) were added simultaneously, with the silver potential and pH held constant, for a period of 29 minutes by a linear flow acceleration method, with the initial flow rate of the $AgNO_3$ solution (3 ml/min) being increased to the end value of 20.4 ml.

Following two minutes agitation, the temperature of the reaction system was lowered to 30° C. and the mixture was washed with water, redispersed at 40° C. and had the pH and pBr adjusted to 6.4 and 3.0, respectively. A replica image of the produced octahedral AgBr emulsion grains was examined under an electron microscope. Various characteristics of those grains are summarized in Table 3 below.

EXAMPLE 4

The apparatus used in Example 3 was expanded to a capacity of 500 l with the relative dimensional proportions remaining unchanged. At the same time, the volume of the formula used in Example 3 was increased by a factor of 125. An octahedral AgBr emulsion was prepared by procedures which were otherwise identical to those employed in Example 3. Various characteristics of the AgBr grains obtained are summarized in Table 3.

Comparative Example 3

Octahedral AgBr grains were prepared to the same formula as used in Example 3, employing the same apparatus as used in Comparative Example 1. Various characteristics of the AgBr grains obtained are summarized in Table 3.

Comparative Example 4

Octahedral AgBr grains were prepared to the same formula as used in Example 4, employing the same apparatus as used in Comparative Example 2. The AgBr grains obtained contained new nuclei that had formed during the crystal growth. Various characteristics of those grains are summarized in Table 3.

TABLE 3

| | Example 3 | Example 4 | Comparative Example 3 | Comparative Example 4 |
|---|---|---|---|---|
| Average grain size (μm) | 0.78 | 0.76 | 0.76 | 0.65 |

TABLE 3-continued

|  | Example 3 | Example 4 | Comparative Example 3 | Comparative Example 4 |
|---|---|---|---|---|
| Coefficient of variation (%) | 4.5 | 4.8 | 4.8 | 15 |
| Percentage of the number of untwinned grains | 100 | 100 | 99.2 | 96 |

The above data shows that the results of small-scale production in Example 3 were in good agreement with those of large-scale production in Example 4 because the apparatus of the present invention was employed in both of these examples. On the other hand, the results of small-scale production in Comparative Example 3 were not in good agreement with those of large-scale production in Comparative Example 4.

EXAMPLE 5

The emulsion prepared in Example 3 was heated to 60° C. and $Na_2S_2O_2.5H_2O$ as a sulfur sensitizer was added in an amount of $2.6 \times 10^{-5}$ mol/mol AgX. Subsequently, a solution of a gold-thiocyanate complex (chloroauric acid:NaSCN=1:100 by molar ratio) was added in an amount of $1.3 \times 10^{-5}$ mol/mol AgX, and ripening was conducted for 50 minutes. Two methods were used to add the chemical sensitizers; one method was conventional and the total amount of the solutions of the chemical sensitizers was added through a test tube within one second, and in the other method, the chemical sensitizers were added using an apparatus having the construction shown in FIG. 5. After the chemical sensitization, the temperature of the emulsion was lowered to 40° C. and an antifoggant TAI (4-hydroxy-6-methyl-1,3,3a,7-tetrazaindene) was added in an amount of $7 \times 10^{-3}$ mol/mol AgX. At the same time, a coating aid was also added. The resulting coating solution was applied onto a tricetyl cellulose film base to give a silver coat weight of 1.5 g/m². After drying, the coated film was exposed through a wedge for one second and developed with a developer (MAA-1) at 20° C. for 10 minutes. The fog and gamma determined from the characteristic curves of the two samples were as shown in Table 4 below.

TABLE 4

| Chemical Sensitizers Adding Method | Prior Art | Present Invention |
|---|---|---|
| Fog | 0.12 | 0.04 |
| Gamma | 3.1 | 3.6 |

As the above data shows, the AgX emulsion that was prepared using the apparatus of the present invention, and which was chemically sensitized with chemical sensitizers that were added using the same apparatus, had a lower fog and a higher gamma.

What is claimed is:

1. A process for producing silver halide emulsion grains comprising the following steps:
    (a) introducing a vessel solution containing at least a dispersion medium and water into a reaction vessel;
    (b) respectively introducing first and second solutions into said vessel solution through porous members located below the surface of the vessel solution, the first solution containing at least a silver salt solution and the second solution containing at least a halogen salt solution;
    (c) uniformly mixing said first and second solutions in the vessel solution., wherein said porous members have $30-10^{15}$ pores provided therein and each of said pores has a diameter of 5 mm or less.

2. A process according to claim 1 wherein said reaction vessel has a capacity of at least 100 liters.

3. A process of producing silver halide emulsion grains by introducing unstable silver halide nuclei into a vessel solution including at least water and a dispersion medium while agitating said vessel solution, comprising the following steps: (a) respectively passing a silver salt solution and a halogen salt solution through porous members; (b) uniformly mixing said silver salt solution and said halogen salt solution in a gelatin solution to form unstable silver halide nuclei, and (c) adding said unstable silver halide nuclei to said vessel solution wherein said porous members each have $30-10^{15}$ pores provided therein and each of said pores has a diameter of 5 mm or less.

4. The process according to claim 3, wherein said porous members are made of elastic material whose percent elongation at elastic limit is at least 5%.

5. A process for producing silver halide emulsion grains comprising the following steps:
    (a) introducing a vessel solution containing at least a dispersion medium and a halogen salt solution into a reaction vessel;
    (b) supplying a first solution containing at least a silver salt solution into a hollow porous member located below the surface of the vessel solution;
    (c) introducing said first solution contained in said porous member into said vessel solution; and thereafter
    (d) uniformly mixing said first solution with the vessel solution by agitation, wherein said porous member has $30-10^{15}$ pores provided therein and each of said pores has a diameter of 5 mm or less.

6. The process of claim 5, further comprising the step of applying a predetermined pressure to said first solution in said porous member to ensure that prior to said introducing step said vessel solution in said vessel does not contact with said first solution in said porous member.

7. The process of claim 5 wherein said porous member has an asymmetric structure.

8. The process of claim 5 wherein said porous member is selected from a group consisting of a mechanically worked porous membrane, a microprocessed porous membrane, a woven fabric porous membrane and a composite porous membrane.

9. The process of claim 5 wherein the degree of scattering of said pores is at least 10% of the maximum allowable value.

10. The process of claim 5 wherein the distance between adjacent pores is at least $10^4$ Angstroms.

11. The process of claim 5 wherein said reaction vessel includes a mixing box disposed therein which is enclosed on all sides thereof and opened at the top and bottom portions thereof, and wherein said introducing step includes introducing said first solution into said mixing box via said porous member.

12. The process of claim 5 wherein said porous member is provided on a wall of said vessel.

13. The process of claim 5 wherein said porous member includes a roll screen formed by spaced apart porous membranes which are fixed to one another by yarn.

14. The process according to claim 5, wherein said supplying step is performed with said porous member exposed to air.

15. The process according to claim 5 wherein said supplying step is conducted using a pump.

16. The process according to claim 5 wherein said porous member has pores whose size is monodispersed and wherein a variation coefficient of the size distribution is not more than 30%.

17. The process according to claim 5 wherein said porous member is made of elastic material.

18. The process according to claim 5 wherein said porous member is a microprocessed organic resist film.

19. The process according to claim 5 wherein said porous member is a mechanically worked elastic porous membrane.

20. The process according to claim 5 wherein said porous member is a woven fabric porous membrane including warps and wefts which are fixed at respective crossing points.

21. The process according to claim 5, wherein said porous member is made of elastic material whose percent elongation at elastic limit is at least 5% and wherein the pore diameter is substantially zero after said first solution has been supplied.

22. The process according to claim 5 wherein said porous member is a hollow porous tube having a gas-relief means to release air in the tube when supplying said first solution into said hollow porous member.

* * * * *